United States Patent
Besser et al.

(10) Patent No.: US 12,491,120 B2
(45) Date of Patent: Dec. 9, 2025

(54) FIRST AID DEVICE

(71) Applicant: ILB Tactical Solutions Ltd., Yesha (IL)

(72) Inventors: Itay Besser, Kibbutz Mishmar Hanegev (IL); Lior Ben Yaakov, Yesha (IL)

(73) Assignee: ILB Tactical Solutions Ltd., Yesha (IL)

( * ) Notice: Subject to any disclaimer, the term of this patent is extended or adjusted under 35 U.S.C. 154(b) by 390 days.

(21) Appl. No.: 18/000,731

(22) PCT Filed: Jun. 6, 2021

(86) PCT No.: PCT/IL2021/050675
§ 371 (c)(1),
(2) Date: Dec. 5, 2022

(87) PCT Pub. No.: WO2021/250655
PCT Pub. Date: Dec. 16, 2021

(65) Prior Publication Data
US 2023/0338193 A1    Oct. 26, 2023

(30) Foreign Application Priority Data

Jun. 7, 2020 (IL) .......................................... 275191

(51) Int. Cl.
*A61F 13/00* (2024.01)
*A61B 17/132* (2006.01)
(Continued)

(52) U.S. Cl.
CPC .... *A61F 13/01042* (2024.01); *A61B 17/1327* (2013.01); *A61F 13/00085* (2013.01); *A61F 17/00* (2013.01)

(58) Field of Classification Search
USPC ........................ 602/42, 43, 53; 606/201, 203
See application file for complete search history.

(56) References Cited

U.S. PATENT DOCUMENTS 3,050,064 A * 8/1962 Moore ............... A61B 17/1325
606/203
5,628,723 A * 5/1997 Grau .................. A61B 17/1325
602/53
(Continued)

FOREIGN PATENT DOCUMENTS

CN    103505258 A    1/2014
CN    203564301 U    4/2014
(Continued)

OTHER PUBLICATIONS

CN 207745161 U Translation (Year: 2018).*
CN 207837602 u Translation (Year: 2018).*

*Primary Examiner* — Kim M Lewis
(74) *Attorney, Agent, or Firm* — Ballard Spahr LLP

(57) ABSTRACT

A first-aid device for controlling a bleeding injury of a limb, said first-aid device comprising, at least in use: an emergency bandage having a blood absorbing portion with a central point, configured for absorbing blood from the injury, and at least one bandage strap connected at least indirectly to the blood absorbing portion and configured for securely mounting the blood absorbing portion to the limb with said blood absorbing portion being positioned over the injury; and a tourniquet having a tourniquet longitudinal axis and attached to the emergency bandage so that, in a plan view of the device, said tourniquet longitudinal axis is spaced from said central point of the emergency bandage to a distance required for limiting blood flow to the injury, said tourniquet having at least one tourniquet strap extending along the tourniquet longitudinal axis and configured for securely mounting the tourniquet to the limb.

12 Claims, 16 Drawing Sheets

(51) Int. Cl.
    *A61F 13/01*     (2024.01)
    *A61F 17/00*     (2006.01)

(56) References Cited

U.S. PATENT DOCUMENTS

| | | | |
|---|---|---|---|
| 7,776,064 B2 | 8/2010 | Jennifer et al. | |
| 2003/0028215 A1* | 2/2003 | Brooks | A61B 17/1327 |
| | | | 606/203 |
| 2003/0176828 A1 | 9/2003 | Buckman et al. | |
| 2005/0049630 A1 | 3/2005 | Ambach | |
| 2005/0240217 A1 | 10/2005 | Jennifer et al. | |
| 2006/0211976 A1 | 9/2006 | Ramsey | |
| 2011/0130739 A1* | 6/2011 | Fitzpatrick | A61B 17/1325 |
| | | | 604/392 |
| 2011/0307004 A1 | 12/2011 | Johnson et al. | |
| 2016/0345981 A1 | 12/2016 | Demas et al. | |

FOREIGN PATENT DOCUMENTS

| | | |
|---|---|---|
| CN | 207745161 U | 8/2018 |
| CN | 207837602 U | 9/2018 |
| CN | 211433138 U | 9/2020 |
| WO | 2019036203 A1 | 2/2019 |

* cited by examiner

FIRST AID DEVICE

TECHNOLOGICAL FIELD

The presently disclosed subject matter refers in general to the filed of first-aid products and more particularly to a first-aid device for controlling a bleeding injury.

BACKGROUND

First-aid treatment is an everyday struggle and concern for emergency medical services, such as paramedics and/or combat soldiers during war. Some of the most basic first-aid treatments can be done by using an emergency bandage or a tourniquet, in some cases the use of both may be required. According to common method of treatment, upon mass-casualty incidents the instructions can be to first place a tourniquet when spotting a bleeding injury and only after evacuation or when the incident is under control to physically check the injuries, which may result in removing the tourniquet and replacing it with an emergency bandage as means for applying direct pressure on injury. On the other hand, in some cases, the emergency bandage may be placed first and if it is not sufficient in controlling the bleeding, the use of a tourniquet may be further required.

GENERAL DESCRIPTION

The presently disclosed subject matter according to the different aspects detailed below is related to various devices for controlling blood flow of a bleeding (hemorrhagic) injury.

As a result of a bleeding injury, a patient may lose a large amount of blood which may lead to hypovolemic (hemorrhagic) shock and even death. The decision of application of either a tourniquet or an emergency bandage as means for direct pressure application is based on various criteria, such as, the severity of the injury, need for amputation, environmental conditions, the circumstances of the event, and the number of patients which require simultaneously treatment.

While the main purpose of an emergency bandage is to staunch blood flow from a traumatic bleeding injury by being directly applied over the injury, the main purpose of a tourniquet is to completely or almost completely stop the arterial blood flow to the injury by being applied in proximity to but not over the injury. Each of these two first-aid devices, i.e., an emergency bandage and a tourniquet, is usually applied in accordance with different treatment protocols, depending on pre-determined criteria as mention above. Each of these devices is usually provided and used separately from each other.

According to these protocols, usually, an emergency bandage should be used for applying direct pressure on the injury for absorbing blood therefrom, and a tourniquet should be used to control the bleeding for the injury in accordance with a pre-determined criteria, e.g., when the injury has not responded adequately to the emergency bandage, or in situations of significant extremity bleeding with the need for additional interventions.

According to a first aspect of the presently disclosed subject matter there is provided a first-aid device for controlling a bleeding injury of a limb, said first-aid device comprising, at least in use:
an emergency bandage having a blood absorbing portion with a central point, configured for absorbing blood from the injury, and at least one bandage strap connected at least indirectly to the blood absorbing portion and configured for securely mounting the blood absorbing portion to the limb with said blood absorbing portion being positioned over the injury; and
a tourniquet having a tourniquet longitudinal axis and attached to the emergency bandage so that, in a plan view of the device, said tourniquet longitudinal axis is spaced from said central point of the emergency bandage to a distance required for limiting blood flow to the injury, said tourniquet having at least one tourniquet strap extending along the tourniquet longitudinal axis and configured for securely mounting the tourniquet to the limb.

The term 'central point' refers herein the specification and the claims to a geometric center, i.e., the arithmetic mean position of all the points of the blood absorbing portion.

The first-aid device of the first aspect is a combination of an emergency bandage and a tourniquet integrally provided in one device side-by-side in proximity to each other, and according to a particular example, detachable from one another, if required. The first-aid device of the first aspect provides various advantages over other known first-aid devices. For example, the first-aid device can provide flexibility to be used for all types and severity levels of bleeding injuries, with the ability to switch from a highly severe level to a non-severe level (i.e., perform conversion) non severe levels to severe levels, and vice versa, in a gradual and controlled manner, without risking the patient, and in an efficient and a quick manner. Due to the simplicity of its operation and the ability to switch between using the emergency bandage and the tourniquet in the above manner, the first-aid device can be operated by a non-professional operator, i.e., not a doctor or a paramedic.

The structure of the first-aid device and, in particular, the distance between the tourniquet and the central point of the emergency bandage also allows correctly positioning the tourniquet with respect to the injury, and at the part of the limb that is closer to the heart. In the case of severe bleeding and life-or-death emergencies, properly positioning a tourniquet in an effective way is highly important to stop bleeding and keep an injured person stable until they can receive proper medical attention. Thus, the first-aid device of the first aspect can assist in this proper positioning.

In addition, in severe situations in which the tourniquet has to be immediately applied, the emergency bandage can still be used for meanwhile absorbing blood from the bleeding injury, until the tourniquet is fully mounted to the limb.

Moreover, the emergency bandage being mounted to the limb can be used in order to dismount the tourniquet from the limb in a controlled manner (i.e., conversion). In this case, the emergency bandage prevents undesired effects of non-controlled blood flow, as it happens with other known tourniquets.

In summary, the combination of the emergency bandage and the tourniquet in one first-aid device allows using the separately and simultaneously, while exploiting the functionality and the advantage of each one of them, and improving the treatment to the patient.

Any one or more of the following features, designs and configurations can be incorporated in the first-aid device of the first aspect of the presently disclosed subject matter, independently or in combination thereof.

The blood absorbing portion can comprise any hemostatic wound dressing configured for absorbing significant amounts of blood, for example, 400-600 cc.

The distance between the tourniquet longitudinal axis and the central point of the emergency bandage can be at least 3 cm, and more particularly, about 4 cm, as required by common first-aid treatment protocols.

The central point of the blood absorbing portion can be configured for being positioned, at least partially, over the center of the bleeding injury in order to apply direct pressure thereon.

The emergency bandage can have a bandage longitudinal axis at least partially parallel to the tourniquet longitudinal axis, and the bandage longitudinal axis can extend through the central point.

The at least one bandage strap can extend along the bandage longitudinal axis.

In a plan view of the device, said tourniquet longitudinal axis can be spaced from the blood absorbing portion.

According to a particular example, the tourniquet can be detachable from the emergency bandage. According to this example, the emergency bandage can further comprise—at least one bandage interconnecting member and the tourniquet can comprise at least one tourniquet interconnecting member, both providing said attachment and detachment between said emergency bandage and the tourniquet.

According to another example, the tourniquet and emergency bandage can be attached to each other, so that they share a common housing, in the form of a sleeve, a cover layer, or any other flexible fabric.

The at least one bandage strap can be more elastic than the tourniquet strap. The bandage strap can be made of a flexible material to prevent over-tightening thereof over the limb thereby unintentionally restricting blood flow to the rest of the limb, acting unintentionally as a tourniquet. The tourniquet strap can on the other hand be made of a much rigid material, enabling it to be effectively tightened over the limb and quickly restricting flood flow to the injury as required.

The emergency bandage can further comprise: at least one lockable element mounted to said bandage strap; and at least one bandage locking port connected at least indirectly to the blood absorbing portion and configured for attachment to the at least bandage lockable element, thereby securing the blood absorbing portion over the injury and applying to the blood absorbing portion a first bandage pressure.

The blood absorbing portion can have a first absorbing surface configured for absorbing blood from the injury and an opposite second absorbing surface.

The bandage strap can have a first and a second bandage lockable elements mounted thereto and spaced from each other along the length of the bandage strap. The emergency bandage can have two bandage locking ports disposed, at least indirectly, on the second absorbing surface, one of the ports being configured for attachment to the first bandage lockable element thereby securing the blood absorbing portion over the injury and apply to the blood absorbing portion a first bandage pressure, and the other one of the bandage ports being configured for attachment to the second bandage lockable element thereby allowing to apply to the blood absorbing portion an additional bandage pressure.

The emergency bandage can further comprise a cover layer disposed over the second absorbing surface. The bandage strap can be connected indirectly to the blood absorbing portion by being connected directly to the cover layer.

The emergency bandage can further comprise a pressure application member disposed at least partially between the first absorbing surface and the cover layer and configured for applying direct pressure onto the injury upon securing the bandage strap when securely mounting the blood absorbing portion over the injury.

According to a particular example, the pressure application member can be disposed at least partially between the second absorbing surface and the cover layer.

The tourniquet can further comprise: a tourniquet locking port configured for securely mounting the tourniquet strap over the limb and applying to the limb a first tourniquet pressure; and a lever-tightening mechanism configured to be used following the application of the first tourniquet pressure for tightening the tourniquet strap and applying to the limb an additional tourniquet pressure.

The lever-tightening mechanism can comprise an elongated rotatable element, and the tourniquet can further comprise an elongated sleeve having two opposite longitudinal boundaries extending along the longitudinal axis such that the elongated rotatable element being manipulated between a first initial state in which said lever-tightening mechanism is disposed, in a plan view of the tourniquet, between the longitudinal boundaries and at least one second pressure exerting state.

The above position of the rotatable element at the initial state is advantageous over another position at which portions of the rotatable element extend beyond one or both of longitudinal boundaries, since it allows the tourniquet to be more compact before usage of the rotatable element, without disturbing the proximal surrounding of the tourniquet. For example, when an emergency bandage is attached to the tourniquet, the above position of the rotatable element at the initial state, does not disturb in operating the emergency bandage.

According to a second aspect of the presently disclosed subject matter, there is provided an emergency bandage for controlling a bleeding injury, having a bandage longitudinal axis, said emergency bandage comprising:

a blood absorbing portion with a central point having a first absorbing surface configured for absorbing blood from the injury and an opposite second absorbing surface;

a bandage strap connected at least indirectly to the blood absorbing portion and having a first and a second bandage lockable elements mounted thereto and spaced from each other along the length of the strap; and two bandage locking ports disposed, at least indirectly, on the second absorbing surface, one of the bandage ports being configured for attachment to the first bandage lockable element thereby securing the blood absorbing portion over the injury and applying to the blood absorbing portion a first bandage pressure, and the other one of the bandage ports being configured for attachment to the second bandage lockable element thereby allowing to apply to the blood absorbing portion an additional bandage pressure The emergency bandage of the second aspect has a dual locking mechanism provided by the bandage locking ports and their respective bandage ports. The dual locking mechanism can better control the degree of direct pressure applied by the emergency bandage to the bleeding injury. In other words, in order to apply one degree of direct bandage pressure, the first bandage locking port and its respective first bandage port are used, and if the bleeding doesn't stop, an additional degree of direct bandage pressure can be applied by using the second bandage locking port and its respective second bandage port.

Any one or more of the following features, designs and configurations can be incorporated in the emergency bandage of the second aspect of the presently disclosed subject matter, independently or in combination thereof.

The bandage locking ports can be disposed along the bandage longitudinal axis.

The bandage locking ports can be disposed on opposite sides of the central point.

The emergency bandage can have a secondary emergency bandage axis which is perpendicular to the bandage longitudinal axis and extending via said central point, such that the two bandage locking ports are disposed on opposite sides of the secondary emergency bandage axis.

The two bandage locking ports can be connected to each other by a bridging member constituting together a double port which is disposed, in a plane view of the emergency bandage, substantially over the central point.

The emergency bandage can further comprise a cover layer disposed over the second absorbing surface, such that the two bandage locking ports are disposed on the cover layer.

The emergency bandage can further comprise a pressure application member disposed at least partially between the first absorbing surface and the cover layer and configured for applying a first direct pressure onto the injury upon application of the first bandage pressure, and applying an additional direct pressure upon application of the additional bandage pressure.

The pressure application member can be connected to the bridging member.

The two bandage locking ports can have a similar structure and can face away from each other.

The first and second bandage lockable elements can be positioned in opposite orientation with respect to the bandage strap. According to this example, after winding the bandage strap around the limb and attaching the first bandage port to the first bandage lockable element, the first bandage pressure can be generated by pulling the bandage strap in one direction. Afterwards, a free portion of the bandage strap including the second bandage lockable element can be used for winding around the limb at a opposite direction and attaching the second bandage port to the second bandage lockable element. Following this attachment, the additional bandage pressure can be generated by pulling the bandage strap in opposite direction. This position of the first and second bandage lockable elements can assist in correctly connecting them to their respective first and second bandage ports, and using them in the correct order.

The first and second bandage lockable elements can be slidable along the bandage strap. This can allow fitting them to the perimeter of any particular limb.

The bandage strap can be at least partially elastic.

The emergency bandage can further comprise at least one bandage interconnecting member mounted to the emergency bandage and configured for detachably attaching thereto at least one tourniquet interconnecting member.

According to a third aspect of the presently disclosed subject matter, there is provided an emergency bandage for controlling a bleeding injury, said emergency bandage comprising:
  a blood absorbing portion having a first absorbing surface configured for facing and absorbing blood from the injury and an opposite second absorbing surface;
  a cover layer disposed over the second absorbing surface;
  at least one bandage strap connected at least indirectly to the blood absorbing portion and configured for securely mounting the blood absorbing portion over the injury; and
  a pressure application member disposed at least partially between the first absorbing surface and the cover layer and configured for applying direct pressure onto the injury upon securing the bandage strap when mounting the blood absorbing portion over the injury.

The pressure application member is configured for applying direct pressure to the injury upon mounting the blood absorbing portion over the injury, thereby assisting in stopping the bleeding from the injury.

Any one or more of the following features, designs and configurations can be incorporated in the emergency bandage of the third aspect of the presently disclosed subject matter, independently or in combination thereof.

The pressure application member can be at least partially disposed between the second absorbing surface and a bottom surface of the cover layer. According to a particular example, the pressure application member can be fully disposed between the second absorbing surface and the cover layer.

The position of the pressure application member between the blood absorbing portion and the cover layer, and for example, not above a top surface of the cover layer, causes the pressure application member to be very close to the injury, and thereby improving its functionality for applying the direct pressure on the injury and assisting in stopping the bleeding.

According to a particular example, the pressure application member can protrude from the bottom surface of the cover layer.

The blood absorbing portion can have a central point such that the pressure application member is disposed at least partially above the central point.

The pressure application member can normally apply pressure on the second absorbing surface and outwardly bend the blood absorbing portion. This structure can provide a user with indication regarding the position of the pressure application member and assist him in correctly positioning the blood absorbing portion, and in particular, the pressure application member directly above the bleeding injury.

The pressure application member can have rigidity greater than a rigidity of the blood absorbing portion, and the pressure application member can be made of a rigid material (e.g., plastic, metal, wood, etc.).

The pressure application member can have a pressure surface configured for facing the second absorbing surface and the pressure surface can be smooth. Having a smooth pressure surface may be important in evenly applying the direct pressure on the injury while not damaging the material of the blood absorbing portion.

According to a particular example, the pressure application member can have a back surface opposite to the pressure surface, and the back surface can be substantially flat while the pressure surface can be spherical.

The emergency bandage can further comprise: at least one bandage lockable element mounted to the bandage strap; and at least one bandage locking port disposed on the cover layer and configured for attachment to the at least one bandage lockable element, thereby securing the blood absorbing portion over the injury and applying a first direct pressure onto the injury. The first direct pressure is applied at least partially by the pressure application member.

The at least one bandage locking port can be connected directly to the pressure application member.

The at least one bandage lockable element can be constituted by a first and a second bandage lockable elements mounted to and spaced from each other along the length of the bandage strap. One of the bandage locking ports is configured for attachment to the first bandage lockable element thereby securing the blood absorbing portion over the injury and applying said first direct pressure onto the injury, and the other one of the bandage ports is configured for attachment to the second bandage lockable element thereby applying an additional direct pressure onto the injury. The additional direct pressure is applied at least partially by the pressure application member. The total pressure applied onto the injury is thus the sum of the first direct pressure and the additional direct pressure.

The two bandage locking ports can be connected directly to the pressure application member.

The two bandage locking ports can be connected to each other by a bridging member constituting together a double port. The pressure application member can be connected to the bridging member. The double port can be made of a rigid material, configured for effectively transferring pressure generated by the tightened bandage strap to the pressure application member.

The emergency bandage can further comprise at least one bandage interconnecting member mounted to the emergency bandage and configured for detachably attaching thereto a tourniquet interconnecting member of a tourniquet.

According to a fourth aspect of the presently disclosed subject matter, there is provided an emergency bandage capable of being used with a tourniquet to constitute at least in use a first-aid device for controlling a bleeding injury, the emergency bandage comprising:

a blood absorbing portion configured for absorbing blood from the injury and at least one bandage strap connected at least indirectly to the blood absorbing portion and configured for securely mounting the blood absorbing portion over the injury, said blood absorbing portion has a first absorbing surface configured for facing the injury and an opposite second absorbing surface; and
  at least one bandage interconnecting member mounted to the emergency bandage and configured for detachably attaching thereto at least one tourniquet interconnecting member of said tourniquet.

While the main purpose of an emergency bandage is to staunch blood flow from a traumatic bleeding injury by being directly applied over the injury, the main purpose of a tourniquet is to completely or almost completely stop the arterial blood flow to the injury by being applied in proximity to but not over the injury. Each of these two first-aid devices, i.e., an emergency bandage and a tourniquet, is usually applied in accordance with different treatment protocols, depending on pre-determined criteria as mention above. Each of these devices is usually provided and used separately from each other.

According to these protocols, usually, an emergency bandage should be used for applying direct pressure on the injury for absorbing blood therefrom, and a tourniquet should be used to control the bleeding for the injury in accordance with a pre-determined criteria, e.g., when the injury has not responded adequately to the emergency bandage, or in situations of significant extremity bleeding with the need for additional interventions.

Therefore, attachment of the tourniquet to the emergency bandage allows converting the emergency bandage to the first-aid device including both an emergency bandage and a tourniquet in a single device, allowing applying the above protocols according to the severity of the injury, and switching from the emergency bandage to the tourniquet, and vice versa, in a gradual and controlled manner, without risking the patient, and in an efficient and a quick manner.

Any one or more of the following features, designs and configurations can be incorporated in the emergency bandage of the fourth aspect of the presently disclosed subject matter, independently or in combination thereof.

The emergency bandage can further comprise a cover layer disposed over the second absorbing surface and the at least one bandage interconnecting member can be mounted to the cover layer.

The emergency bandage can further comprise a pressure application member disposed at least partially between the first absorbing surface and the cover layer and configured for applying direct pressure onto the injury upon securing the bandage strap when securely mounting the blood absorbing portion over the injury.

The emergency bandage can have a bandage longitudinal axis along which the at least one bandage strap extends, and the cover layer can have two opposite side portions extending along and two sides of the bandage longitudinal axis, so that the bandage interconnecting member constitutes a part of one of the side portions.

The bandage interconnecting member can be spaced from the at least one bandage strap.

The bandage interconnecting member can elongated so as to correspond in shape to the tourniquet interconnecting member.

The at least one bandage interconnecting member can further be configured for detachably attaching thereto an additional bandage interconnecting member of a second emergency bandage.

The bandage strap can be at least partially elastic.

The emergency bandage can further comprise: at least one bandage lockable element mounted to said at least one bandage strap; and at least one bandage locking port connected at least indirectly to the blood absorbing portion and configured for attachment to the at least one bandage lockable element, thereby securing the blood absorbing portion over the injury and applying a first direct pressure onto the injury.

The at least one bandage lockable element can be constituted by a first and a second bandage lockable elements mounted to and spaced from each other along the length of the bandage strap; and wherein said at least one bandage locking port is constituted by two bandage locking ports disposed on the cover layer. One of the bandage locking ports can be configured for attachment to the first bandage lockable element thereby securing the blood absorbing portion over the injury and applying the first direct pressure onto the injury, and the other one of the bandage ports can be configured for attachment to the second bandage lockable element thereby applying an additional direct pressure onto the injury.

According to a fifth aspect of the presently disclosed subject matter, there is provided a tourniquet capable of being used with an emergency bandage to constitute at least in use a first-aid device for controlling a bleeding injury of a limb, said tourniquet having a tourniquet longitudinal axis and comprising:

at least one tourniquet strap extending along the tourniquet longitudinal axis and configured for securely mounting the tourniquet to the limb; and
  at least one tourniquet interconnecting member mounted to the tourniquet and configured for detachably attaching thereto a bandage interconnecting member of said emergency bandage.

While the main purpose of an emergency bandage is to staunch blood flow from a traumatic bleeding injury by being directly applied over the injury, the main purpose of a tourniquet is to completely or almost completely stop the arterial blood flow to the injury by being applied in proximity to but not over the injury. Each of these two first-aid devices, i.e., an emergency bandage and a tourniquet, is usually applied in accordance with different treatment protocols, depending on pre-determined criteria as mention above. Each of these devices is usually provided and used separately from each other.

According to these protocols, usually, an emergency bandage should be used for applying direct pressure on the injury for absorbing blood therefrom, and a tourniquet should be used to control the bleeding for the injury in accordance with a pre-determined criteria, e.g., when the injury has not responded adequately to the emergency bandage, or in situations of significant extremity bleeding with the need for additional interventions.

Therefore, attachment of the emergency bandage to the tourniquet allows converting the emergency bandage to the first-aid device including both a tourniquet and an emergency bandage in a single device, allowing applying the above protocols according to the severity of the injury, and switching from the emergency bandage to the tourniquet, and vice versa, in a gradual and controlled manner, without risking the patient, and in an efficient and a quick manner.

Any one or more of the following features, designs and configurations can be incorporated in the tourniquet of the fifth aspect of the presently disclosed subject matter, independently or in combination thereof.

The tourniquet can further comprise an elongated sleeve such that at least a portion of the tourniquet strap passing therethrough and the at least one tourniquet interconnecting member being mounted thereto.

The sleeve can comprise a side portion with the at least one tourniquet interconnecting member constituting a part thereof, so that in a plan view of the tourniquet, the tourniquet interconnecting member is spaced from the tourniquet strap.

The tourniquet interconnecting member can be elongated so as to correspond in shape to the bandage interconnecting member.

The tourniquet can further comprise: a tourniquet locking port configured for securely mounting the tourniquet strap over the limb and applying to the limb a first tourniquet pressure; and a lever-tightening mechanism configured to be used following the application of the first tourniquet pressure for tightening the tourniquet strap and applying to the limb an additional tourniquet pressure. The additional tourniquet pressure can be the pressure required for obtaining full restriction of blood flow to the injury.

The lever-tightening mechanism can comprise an elongated rotatable element connected to said tourniquet strap. The elongated rotatable element can be rotatable between a first initial state and at least one second pressure exerting state.

The tourniquet can further comprise an elongated sleeve having two opposite longitudinal boundaries extending along the longitudinal axis such that the elongated rotatable element is manipulated between a first initial state in which said lever-tightening mechanism is disposed, in a plan view of the tourniquet, between the longitudinal boundaries.

The above position of the rotatable element at the initial state is advantageous over another position at which portions of the rotatable element extend beyond one or both of longitudinal boundaries, since it allows the tourniquet to be more compact before usage of the rotatable element, without disturbing the proximal surrounding of the tourniquet. For example, when an emergency bandage is attached to the tourniquet, the above position of the rotatable element at the initial state, does not disturb in operating the emergency bandage.

According to a sixth aspect of the presently disclosed subject matter, there is provided a tourniquet having a tourniquet longitudinal axis and configured for controlling a bleeding injury of a limb, said tourniquet comprising:
  an elongated sleeve having two opposite longitudinal boundaries extending along the tourniquet longitudinal axis, said sleeve having a sleeve first surface configured for facing the limb and an opposite sleeve second surface comprising an access point;
  a tourniquet strap extending along the tourniquet longitudinal axis at least partially within said sleeve;
  a tourniquet locking port configured for securely mounting the tourniquet strap to the limb; and
  an elongated rotatable element connected to said tourniquet strap via the access point, said rotatable element being rotatable together with a portion of said tourniquet strap at said access between an initial state in which the rotatable element is disposed, in a plan view of the tourniquet, between the longitudinal boundaries, and at least one pressure exerting state.

The above position of the rotatable element at the initial state is advantageous over another position at which portions of the rotatable element extend beyond one or both of longitudinal boundaries, since it allows the tourniquet to be more compact before usage of the rotatable element, without disturbing the proximal surrounding of the tourniquet. For example, when an emergency bandage is attached to the tourniquet, the above position of the rotatable element at the initial state, does not disturb in operating the emergency bandage.

Any one or more of the following features, designs and configurations can be incorporated in the tourniquet of the sixth aspect of the presently disclosed subject matter, independently or in combination thereof.

The tourniquet strap can be provided with a tourniquet lockable element configured for being attached to the tourniquet locking port.

The attachment of the tourniquet lockable element to the tourniquet locking port can be configured for securely mounting the tourniquet strap over the limb and applying to the limb a first tourniquet pressure, and the elongated rotatable element, which constitutes a lever-tightening mechanism is configured to be used following the application of the first tourniquet pressure for tightening the tourniquet strap and applying to the limb an additional tourniquet pressure. The additional tourniquet pressure can be the pressure required for obtaining full restriction of blood flow to the injury.

The tourniquet lockable element can be slidable along the tourniquet strap.

The elongated rotatable element can have an elongated rotatable element longitudinal axis, so that at the initial state, the elongated rotatable element longitudinal axis is substantially parallel to the tourniquet longitudinal axis.

The elongated rotatable element can have a rotatable element longitudinal axis and a length dimension extending along said rotatable element longitudinal axis. The length dimension can be greater than a distance between said longitudinal boundaries.

The tourniquet can further comprise a securing member disposed at least partially over the sleeve and configured for releasably locking the elongated rotatable element at one or more of said pressure exerting states, so that in a plan view of the tourniquet, the rotatable element is disposed between the longitudinal boundaries of the sleeve.

EMBODIMENTS

A more specific description is provided in the Detailed Description whilst the following are non-limiting examples of different embodiments of the presently disclosed subject matter. It should be appreciated that Embodiments 1 to 15, correspond to the first aspect of the presently disclosed subject matter; Embodiments 16 to 29, correspond to the second aspect of the presently disclosed subject matter; Embodiments 30 to 45, correspond to the third aspect of the presently disclosed subject matter; Embodiments 46 to 55, correspond to the fourth aspect of the presently disclosed subject matter; Embodiments 56 to 61, correspond to the fifth aspect of the presently disclosed subject matter; and that Embodiments 62 to 69, correspond to the sixth aspect of the presently disclosed subject matter.

1. A first-aid device for controlling a bleeding injury of a limb, said first-aid device comprising, at least in use:
an emergency bandage having a blood absorbing portion with a central point, configured for absorbing blood from the injury, and at least one bandage strap connected at least indirectly to the blood absorbing portion and configured for securely mounting the blood absorbing portion to the limb with said blood absorbing portion being positioned over the injury; and a tourniquet having a tourniquet longitudinal axis and attached to the emergency bandage so that, in a plan view of the device, said tourniquet longitudinal axis is spaced from said central point of the emergency bandage to a distance required for limiting blood flow to the injury, said tourniquet having at least one tourniquet strap extending along the tourniquet longitudinal axis and configured for securely mounting the tourniquet to the limb.

2. The first-aid device of Embodiment 1, wherein said distance is at least 3 cm.

3. The first-aid device of Embodiment 1 or 2, wherein said emergency bandage has a bandage longitudinal axis at least partially parallel to the tourniquet longitudinal axis.

4. The first-aid device of Embodiment 3, wherein said bandage longitudinal axis extends through the central point.

5. The first-aid device of Embodiment 3 or 4, wherein said at least one bandage strap extends along the bandage longitudinal axis.

6. The first-aid device of any one of the preceding embodiments, wherein in a plan view of the device, said tourniquet longitudinal axis is spaced from the blood absorbing portion.

7. The first-aid device of any one of the preceding embodiments, wherein said tourniquet is detachable from said emergency bandage.

8. The first-aid device of any one of the preceding embodiments, wherein said at least one bandage strap is more elastic than the tourniquet strap.

9. The first-aid device of any one of the preceding embodiments, wherein said emergency bandage further comprises: at least one lockable element mounted to said bandage strap; and at least one bandage locking port connected at least indirectly to the blood absorbing portion and configured for attachment to said at least bandage lockable element, thereby securing the blood absorbing portion over the injury and applying to the blood absorbing portion a first bandage pressure.

10. The first-aid device of any one of Embodiments 1 to 8, wherein said blood absorbing portion has a first absorbing surface configured for absorbing blood from the injury and an opposite second absorbing surface; said bandage strap has a first and a second bandage lockable elements mounted thereto and spaced from each other along the length of the bandage strap; and two bandage locking ports disposed, at least indirectly, on the second absorbing surface, one of the ports being configured for attachment to the first bandage lockable element thereby securing the blood absorbing portion over the injury and apply to the blood absorbing portion a first bandage pressure, and the other one of the bandage ports being configured for attachment to the second bandage lockable element thereby allowing to apply to the blood absorbing portion an additional bandage pressure.

11. The first-aid device of any one of the preceding embodiments, wherein said blood absorbing portion has a first absorbing surface configured for absorbing blood from the injury and an opposite second absorbing surface; and wherein said bandage further comprises a cover layer disposed over the second absorbing surface; and a pressure application member disposed at least partially between the first absorbing surface and the cover layer and configured for applying direct pressure onto the injury upon securing the bandage strap when securely mounting the blood absorbing portion over the injury.

12. The first-aid device of Embodiment 11, wherein said pressure application member is disposed at least partially between the second absorbing surface and the cover layer.

13. The first-aid device of any one of the preceding embodiments, wherein said emergency bandage further comprises at least one bandage interconnecting member and said tourniquet comprises at least one tourniquet interconnecting member, both providing said attachment and detachment between said emergency bandage and the tourniquet.

14. The first-aid device of any one of the preceding embodiments, wherein said tourniquet further comprises: a tourniquet locking port configured for securely mounting the tourniquet strap over the limb and applying to the limb a first tourniquet pressure; and a lever-tightening mechanism configured to be used following the application of the first tourniquet pressure for tightening the tourniquet strap and applying to the limb an additional tourniquet pressure.

15. The first-aid device of Embodiment 14, wherein said lever-tightening mechanism is an elongated rotatable element; and wherein said tourniquet further comprises an elongated sleeve having two opposite longitudinal boundaries extending along the longitudinal axis such that the elongated rotatable element being manipulated between a first initial state in which said lever-tightening mechanism is disposed, in a plan view of the tourniquet, between the longitudinal boundaries and at least one second pressure exerting state.

16. An emergency bandage for controlling a bleeding injury, having a bandage longitudinal axis, said emergency bandage comprising:
a blood absorbing portion with a central point having a first absorbing surface configured for absorbing blood from the injury and an opposite second absorbing surface;
a bandage strap connected at least indirectly to the blood absorbing portion and having a first and a second bandage lockable elements mounted thereto and spaced from each other along the length of the strap; and
two bandage locking ports disposed, at least indirectly, on the second absorbing surface, one of the bandage ports being configured for attachment to the first bandage lockable element thereby securing the blood absorbing portion over the injury and applying to the blood absorbing portion a first bandage pressure, and the other one of the bandage ports being configured for attachment to the second bandage lockable element thereby allowing to apply to the blood absorbing portion an additional bandage pressure.

17. The emergency bandage of Embodiment 16, wherein said bandage locking ports are disposed along the bandage longitudinal axis.

18. The emergency bandage of Embodiment 16 or 17, wherein said bandage locking ports are disposed on opposite sides of said central point.

19. The emergency bandage of any one of Embodiments 16 to 18, wherein said emergency bandage has a secondary emergency bandage axis being perpendicular to said bandage longitudinal axis and extends via said central point, such that the two bandage locking ports are disposed on opposite sides of said secondary emergency bandage axis.

20. The emergency bandage of any one of Embodiments 16 to 19, wherein said two bandage locking ports are connected to each other by a bridging member constituting together a double port which is disposed, in a plane view of the emergency bandage, substantially over said central point.

21. The emergency bandage of any one of Embodiments 16 to 20, further comprising a cover layer disposed over the second absorbing surface, such that the two bandage locking ports are disposed on the cover layer.

22. The emergency bandage of Embodiment 21, further comprising a pressure application member disposed at least partially between the first absorbing surface and the cover layer and configured for applying a first direct pressure onto the injury upon application of the first bandage pressure, and applying an additional direct pressure upon application of the additional bandage pressure.

23. The emergency bandage of Embodiment 22, when dependent on Embodiment 20, wherein said pressure application member is connected to said bridging member.

24. The emergency bandage of any one of Embodiments 16 to 23, wherein said two bandage locking ports have a similar structure and are facing away from each other.

25. The emergency bandage of any one of Embodiments 16 to 24, wherein said first and second bandage lockable elements are positioned in opposite orientation with respect to said bandage strap.

26. The emergency bandage of any one of Embodiments 16 to 25, wherein the first bandage pressure is configured to be generated by pulling the bandage strap in one direction and the additional bandage pressure is configured to be generated by pulling the bandage strap in an opposite direction.

27. The emergency bandage of any one of Embodiments 16 to 26, wherein at least one of said first and second bandage lockable elements is slidable along the bandage strap.

28. The emergency bandage of any one of Embodiments 16 to 27, wherein said bandage strap is at least partially elastic.

29. The emergency bandage of any one of Embodiments 16 to 28, wherein said emergency bandage further comprises at least one bandage interconnecting member mounted to the emergency bandage and configured for detachably attaching thereto at least one tourniquet interconnecting member.

30. An emergency bandage for controlling a bleeding injury, said emergency bandage comprising:
a blood absorbing portion having a first absorbing surface configured for facing and absorbing blood from the injury and an opposite second absorbing surface;
a cover layer disposed over the second absorbing surface;
at least one bandage strap connected at least indirectly to the blood absorbing portion and configured for securely mounting the blood absorbing portion over the injury; and
a pressure application member disposed at least partially between the first absorbing surface and the cover layer and configured for applying direct pressure onto the injury upon securing the bandage strap when mounting the blood absorbing portion over the injury.

31. The emergency bandage of Embodiment 30, wherein said pressure application member is at least partially disposed between the second absorbing surface and a bottom surface of the cover layer.

32. The emergency bandage of Embodiment 31, wherein the pressure application member protrudes from the bottom surface.

33. The emergency bandage of any one of Embodiments 30 to 32, wherein said blood absorbing portion has a central point such that said pressure application member is disposed at least partially above said central point.

34. The emergency bandage of any one of Embodiments 30 to 33, wherein said pressure application member normally applies pressure on the second absorbing surface and outwardly bends the blood absorbing portion.

35. The emergency bandage of any one of Embodiments 30 to 34, wherein said pressure application member has rigidity greater than a rigidity of the blood absorbing portion.

36. The emergency bandage of any one of Embodiments 30 to 35, wherein said pressure application member is made of a rigid material.

37. The emergency bandage of any one of Embodiments 30 to 36, wherein said pressure application member has a pressure surface configured for facing the second absorbing surface and said pressure surface is smooth.

38. The emergency bandage of Embodiment 37, wherein said pressure application member has a back surface opposite to said pressure surface, and wherein said back surface is substantially flat and said pressure surface is spherical.

39. The emergency bandage of any one of Embodiments 30 to 38, wherein said pressure application member is fully disposed between the second absorbing surface and the cover layer.

40. The emergency bandage of any one of Embodiments 30 to 39, further comprising at least one bandage lockable element mounted to said bandage strap; and at least one bandage locking port disposed on the cover layer and configured for attachment to said at least one bandage lockable element, thereby securing the blood absorbing portion over the injury and applying a first direct pressure onto the injury.

41. The emergency bandage of Embodiment 40, wherein said at least one bandage locking port is connected directly to the pressure application member.

42. The emergency bandage of any one of Embodiments 40 and 41, wherein said at least one bandage lockable element is constituted by a first and a second bandage lockable elements mounted to and spaced from each other along the length of the bandage strap; and wherein said at least one bandage locking port is constituted by two bandage locking ports disposed on the cover layer; and wherein one of the bandage locking ports is configured for attachment to the first bandage lockable element thereby securing the blood absorbing portion over the injury and applying said first direct pressure onto the injury, and the other one of the bandage ports is configured for attachment to the second bandage lockable element thereby applying an additional direct pressure onto the injury.

43. The emergency bandage of Embodiment 42, wherein said two bandage locking ports are connected directly to the pressure application member 44. The emergency bandage of Embodiment 43, wherein said two bandage locking ports are connected to each other by a bridging member constituting together a double port; and wherein said pressure application member is connected to said bridging member.

45. The emergency bandage of any one of Embodiments 30 to 44, wherein said emergency bandage further comprises at least one bandage interconnecting member mounted to the emergency bandage and configured for detachably attaching thereto a tourniquet interconnecting member of a tourniquet.

46. An emergency bandage capable of being used with a tourniquet to constitute at least in use a first-aid device for controlling a bleeding injury, the emergency bandage comprising:
    a blood absorbing portion configured for absorbing blood from the injury and at least one bandage strap connected at least indirectly to the blood absorbing portion and configured for securely mounting the blood absorbing portion over the injury, said blood absorbing portion has a first absorbing surface configured for facing the injury and an opposite second absorbing surface; and
    at least one bandage interconnecting member mounted to the emergency bandage and configured for detachably attaching thereto at least one tourniquet interconnecting member of said tourniquet.

47. The emergency bandage of Embodiment 46, further comprising a cover layer disposed over the second absorbing surface and the at least one bandage interconnecting member being mounted to the cover layer.

48. The emergency bandage of Embodiment 47, further comprising a pressure application member disposed at least partially between the first absorbing surface and the cover layer and configured for applying direct pressure onto the injury upon securing the bandage strap when securely mounting the blood absorbing portion over the injury.

49. The emergency bandage of Embodiment 47 or 48, wherein said emergency bandage has a bandage longitudinal axis along which said at least one bandage strap extends, and wherein said cover layer has two opposite side portions extending along and two sides of the bandage longitudinal axis; and wherein said bandage interconnecting member constitutes a part of one of the side portions.

50. The emergency bandage of any one of Embodiments 46 to 49, wherein said bandage interconnecting member is spaced from the at least one bandage strap.

51. The emergency bandage of any one of Embodiments 46 to 50, wherein said bandage interconnecting member is elongated so as to correspond in shape to the tourniquet interconnecting member.

52. The emergency bandage of any one of Embodiments 46 to 51, wherein the at least one bandage interconnecting member is further configured for detachably attaching thereto an additional bandage interconnecting member of a second emergency bandage.

53. The emergency bandage of any one Embodiments 46 to 52, wherein said bandage strap is at least partially elastic.

54. The emergency bandage of any one of Embodiments 46 to 53, wherein said emergency bandage further comprises: at least one bandage lockable element mounted to said at least one bandage strap; and at least one bandage locking port connected at least indirectly to the blood absorbing portion and configured for attachment to said at least one bandage lockable element, thereby securing the blood absorbing portion over the injury and applying a first direct pressure onto the injury.

55. The emergency bandage of any one of Embodiments 46 to 54, wherein said at least one bandage lockable element is constituted by a first and a second bandage lockable elements mounted to and spaced from each other along the length of the bandage strap; and wherein said at least one bandage locking port is constituted by two bandage locking ports disposed on the cover layer; and wherein one of the bandage locking ports is configured for attachment to the first bandage lockable element thereby securing the blood absorbing portion over the injury and applying said first direct pressure onto the injury, and the other one of the bandage ports is configured for attachment to the second bandage lockable element thereby applying an additional direct pressure onto the injury.

56. A tourniquet capable of being used with an emergency bandage to constitute at least in use a first-aid device for controlling a bleeding injury of a limb, said tourniquet having a tourniquet longitudinal axis and comprising:
    at least one tourniquet strap extending along the tourniquet longitudinal axis and configured for securely mounting the tourniquet to the limb; and
    at least one tourniquet interconnecting member mounted to the tourniquet and configured for detachably attaching thereto a bandage interconnecting member of said emergency bandage.

57. The tourniquet of Embodiment 56, further comprising an elongated sleeve such that at least a portion of the tourniquet strap passing therethrough and the at least one tourniquet interconnecting member being mounted thereto.

58. The tourniquet of Embodiment 57, wherein said sleeve comprises a side portion with said at least one tourniquet interconnecting member constituting a part thereto, so that in a plan view of the tourniquet, said tourniquet interconnecting member is spaced from the tourniquet strap.

59. The tourniquet of any one of Embodiments 56 to 58, wherein said tourniquet interconnecting member is elongated so as to correspond in shape to the bandage interconnecting member.

60. The tourniquet of any one of Embodiments 56 to 59, wherein said tourniquet further comprises: a tourniquet locking port configured for securely mounting the tourniquet strap over the limb and applying to the limb a first tourniquet pressure; and a lever-tightening mechanism configured to be used following the application of the first tourniquet pressure for tightening the tourniquet strap and applying to the limb an additional tourniquet pressure.

61. The tourniquet of Embodiment 60, wherein said lever-tightening mechanism is an elongated rotatable element connected to said tourniquet strap, said elongated rotatable element being rotatable between a first initial state and at least one second pressure exerting state.

62. A tourniquet having a tourniquet longitudinal axis and configured for controlling a bleeding injury of a limb, said tourniquet comprising:
    an elongated sleeve having two opposite longitudinal boundaries extending along the tourniquet longitudinal axis, said sleeve having a sleeve first surface configured for facing the limb and an opposite sleeve second surface comprising an access point;
    a tourniquet strap extending along the tourniquet longitudinal axis at least partially within said sleeve;
    a tourniquet locking port configured for securely mounting the tourniquet strap to the limb; and an elongated rotatable element connected to said tourniquet strap via the access point, said rotatable element being rotatable together with a portion of said tourniquet strap at said access between an initial state in which the rotatable element is disposed, in a plan view of the tourniquet, between the longitudinal boundaries, and at least one pressure exerting state.

63. The tourniquet of Embodiment 62, wherein said tourniquet strap is provided with a tourniquet lockable element configured for being attached to said tourniquet locking port.

64. The tourniquet of Embodiment 63, wherein said tourniquet lockable element is slidable along the tourniquet strap.

65. The tourniquet of any one of Embodiments 62 to 64, wherein said tourniquet locking port is further configured for applying to the limb a first tourniquet pressure.

66. The tourniquet of Embodiment 65, wherein said elongated rotatable element is further configured to be used following the application of the first tourniquet pressure for tightening the tourniquet strap and applying to the limb an additional tourniquet pressure.

67. The tourniquet of any one of Embodiments 62 to 66, wherein said elongated rotatable element has an elongated rotatable element longitudinal axis, so that at said initial state, said elongated rotatable element longitudinal axis is substantially parallel to said tourniquet longitudinal axis.

68. The tourniquet of any one of Embodiments 62 to 67, wherein said elongated rotatable element has a rotatable element longitudinal axis and a length dimension extending along said rotatable element longitudinal axis; and wherein said length dimension is greater than a distance between said longitudinal boundaries.

69. The tourniquet of any one of Embodiments 62 to 68, further comprising a securing member disposed at least partially over the sleeve and configured for releasably locking the elongated rotatable element at one or more of said pressure exerting states, so that in a plan view of the tourniquet, the rotatable element is disposed between the longitudinal boundaries of the sleeve.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION OF EMBODIMENTS

Figure 1A:
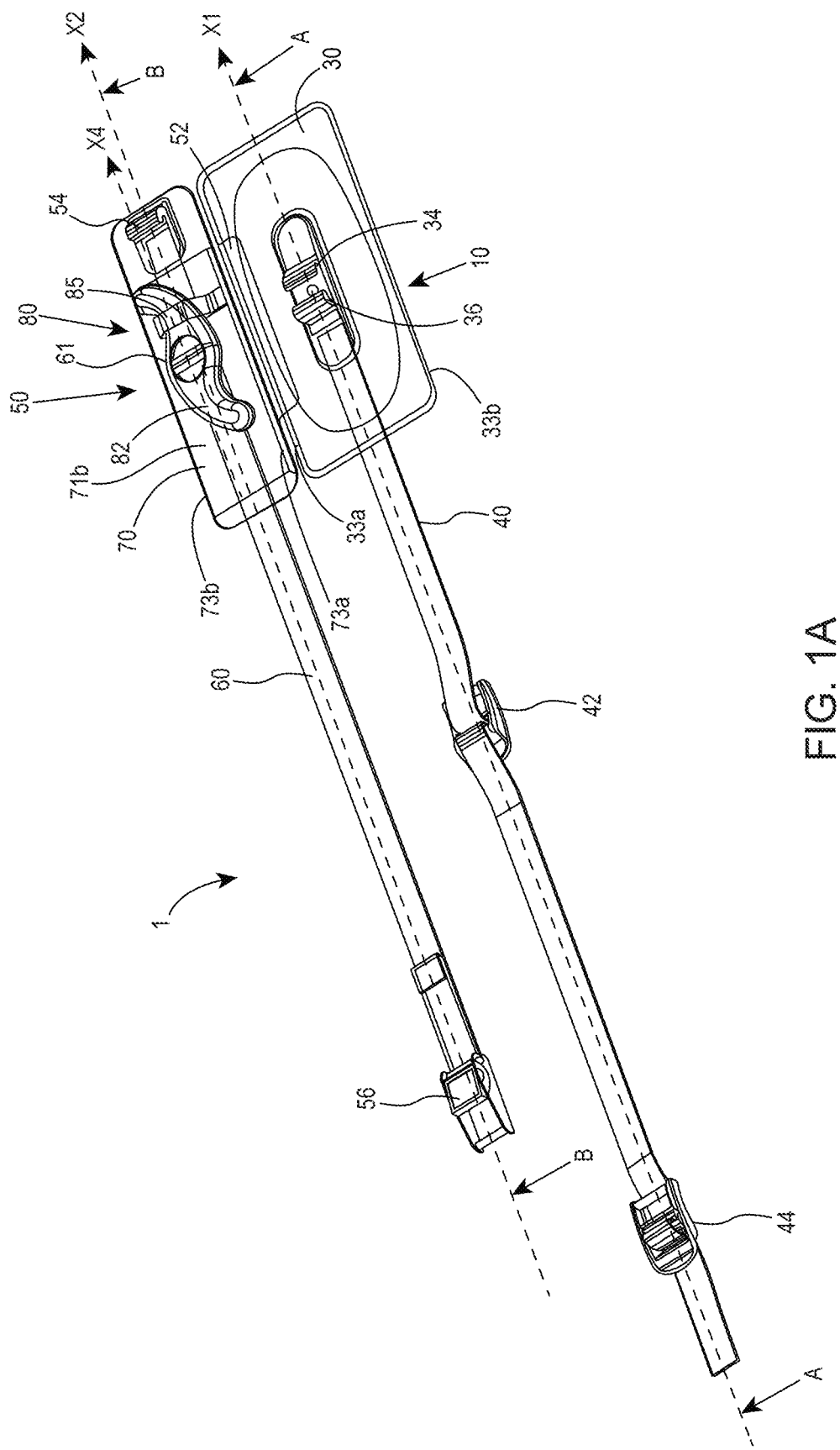
FIG. 1A is a perspective top view of a first-aid device with an emergency bandage and a tourniquet attached to each other side-by-side, according to one example of the presently disclosed subject matter.
Figure 1B:
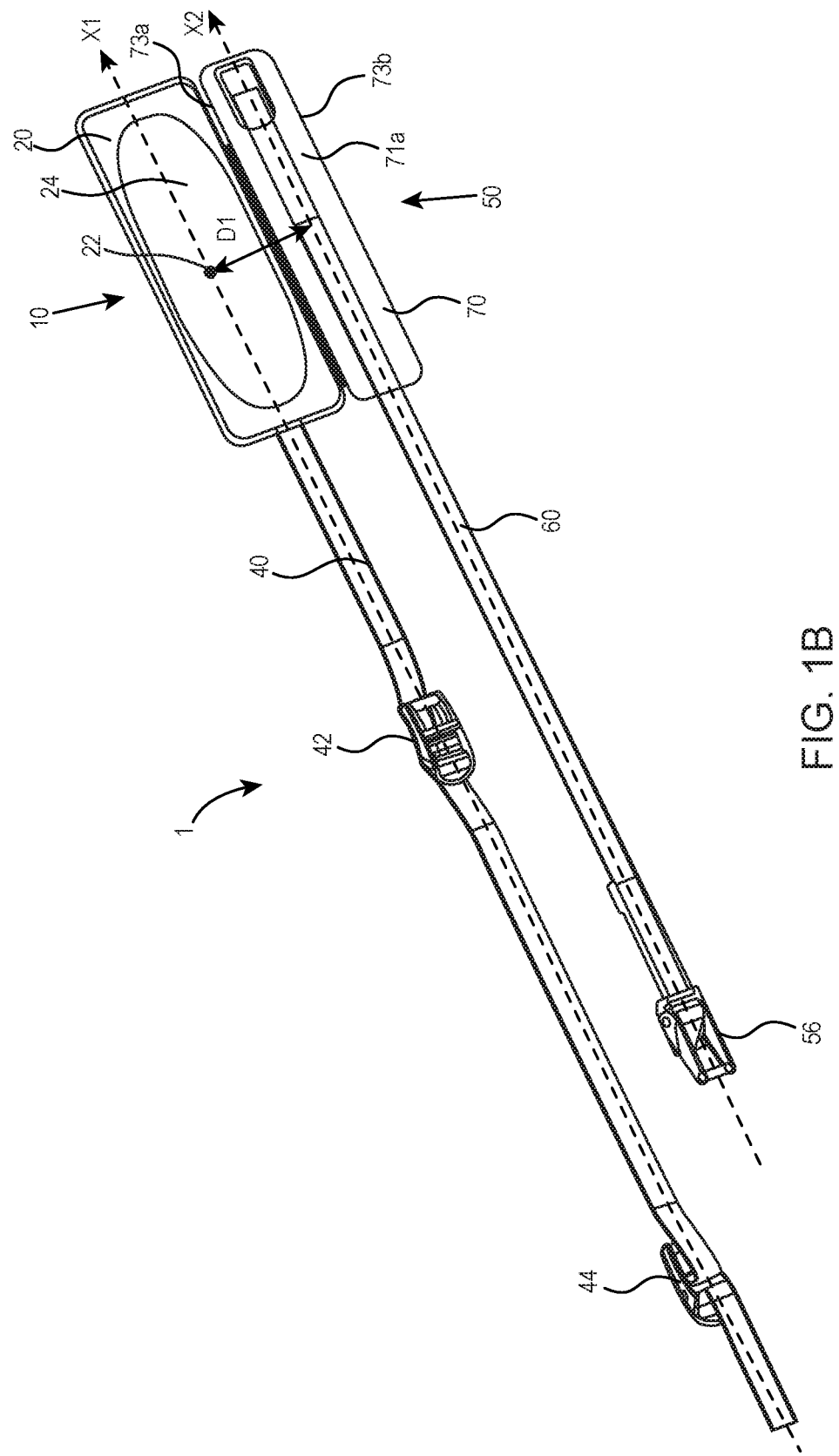
FIG. 1B is a perspective bottom view of the first-aid device of FIG. 1A.
Figure 1C:
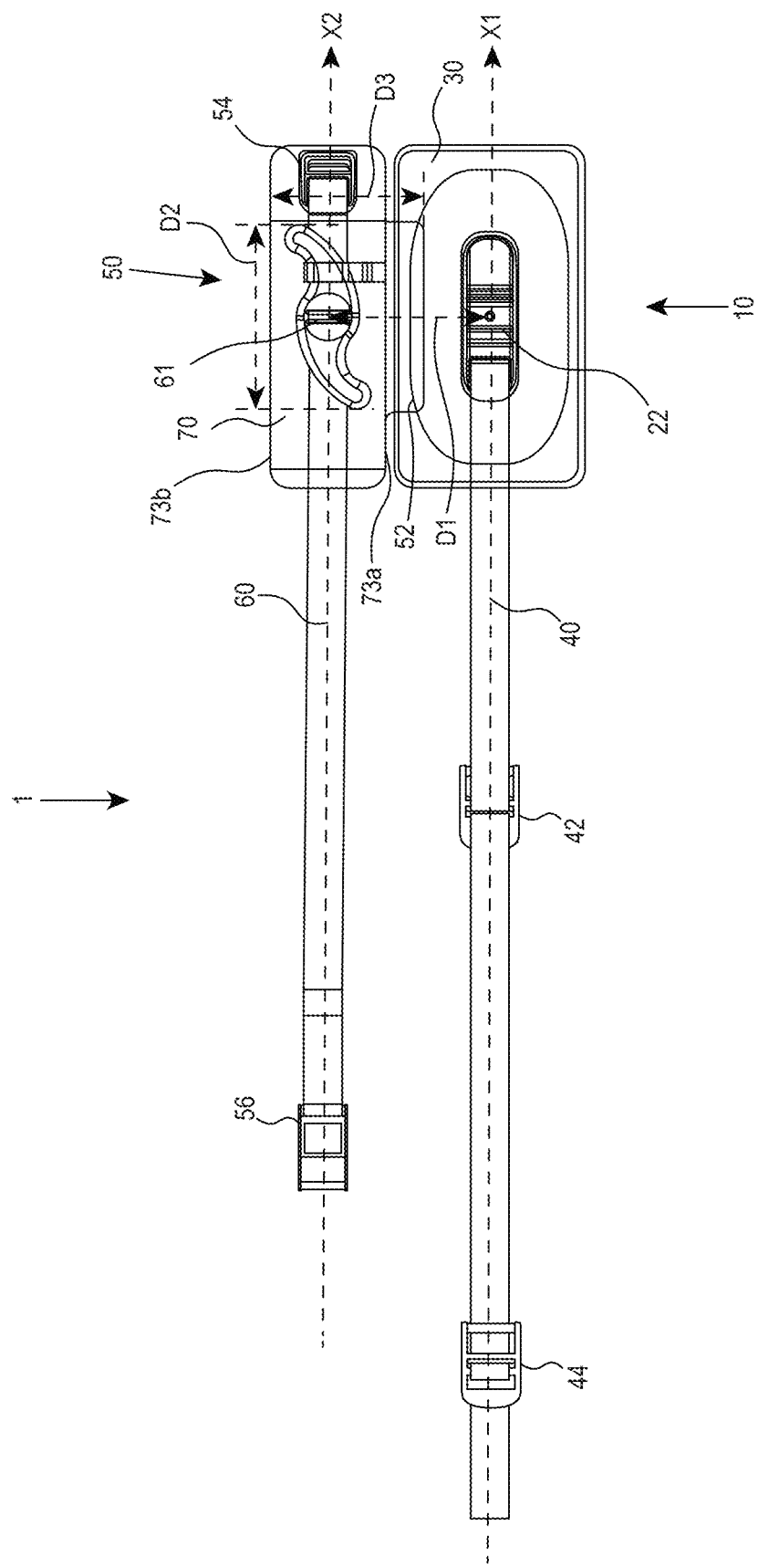
FIG. 1C is a top view of the first-aid device of FIG. 1A.
Figure 1D:
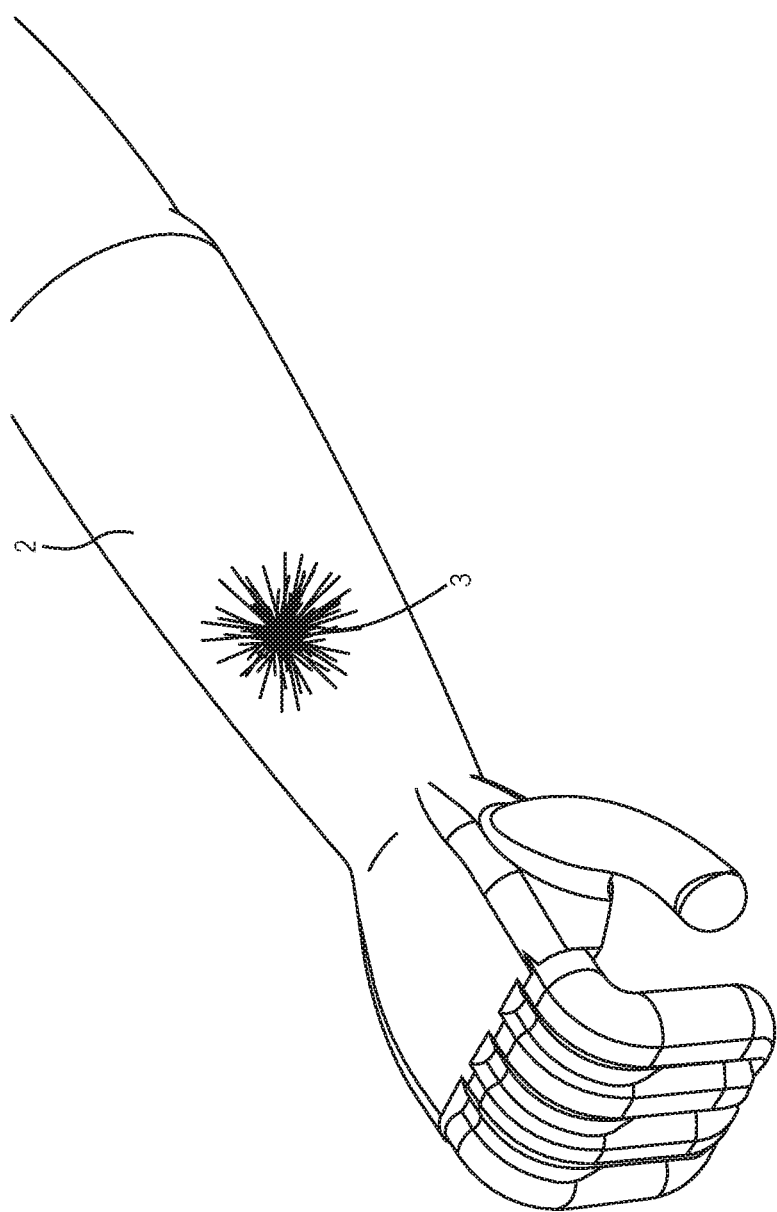
FIG. 1D is the first-aid device of FIG. 1A being mounted to a limb in the form of a hand of a patient.
Figure 1E:
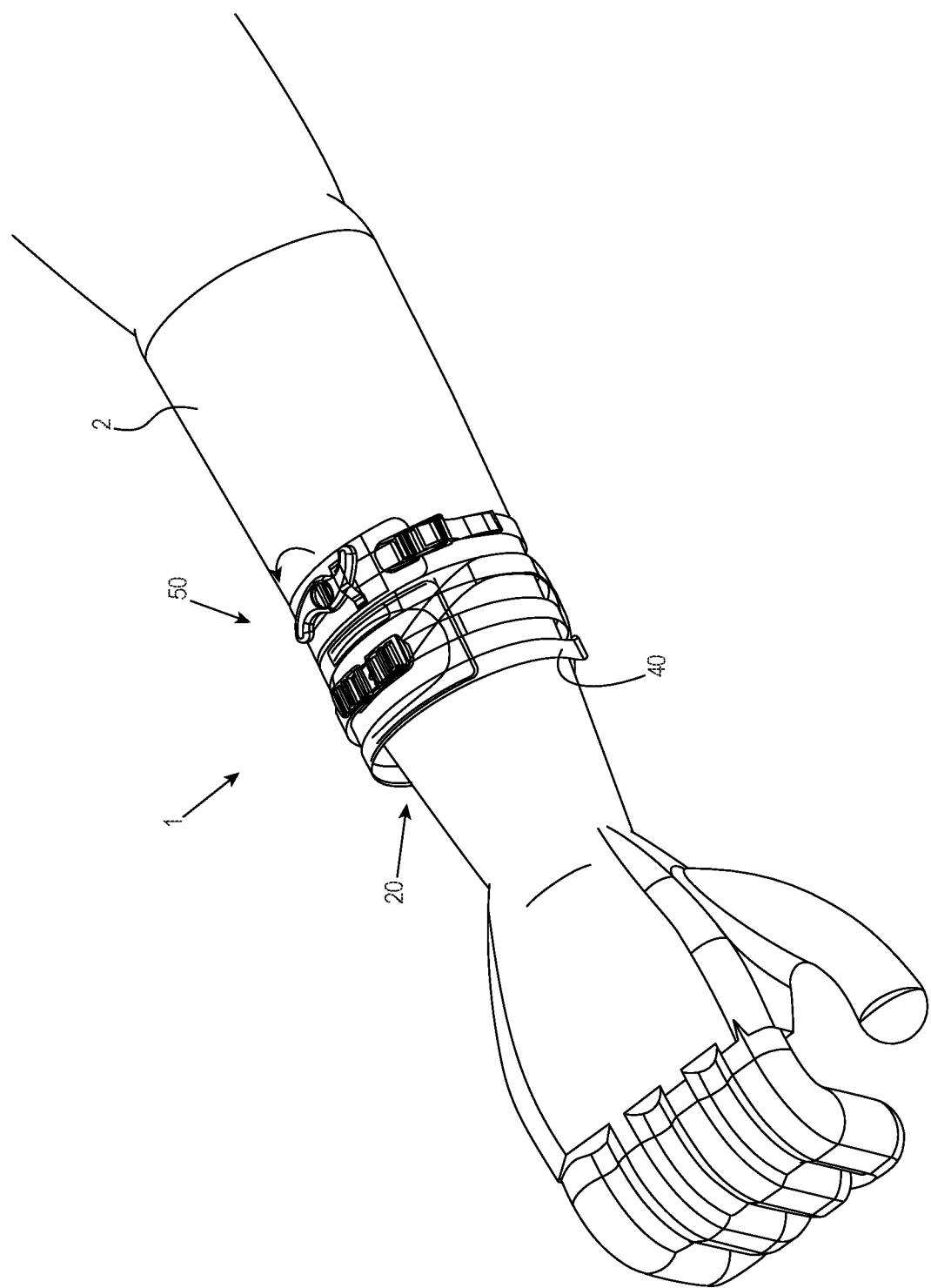
FIG. 1E is the hand of FIG. 1D with a bleeding injury to be treated.
Figure 1F:
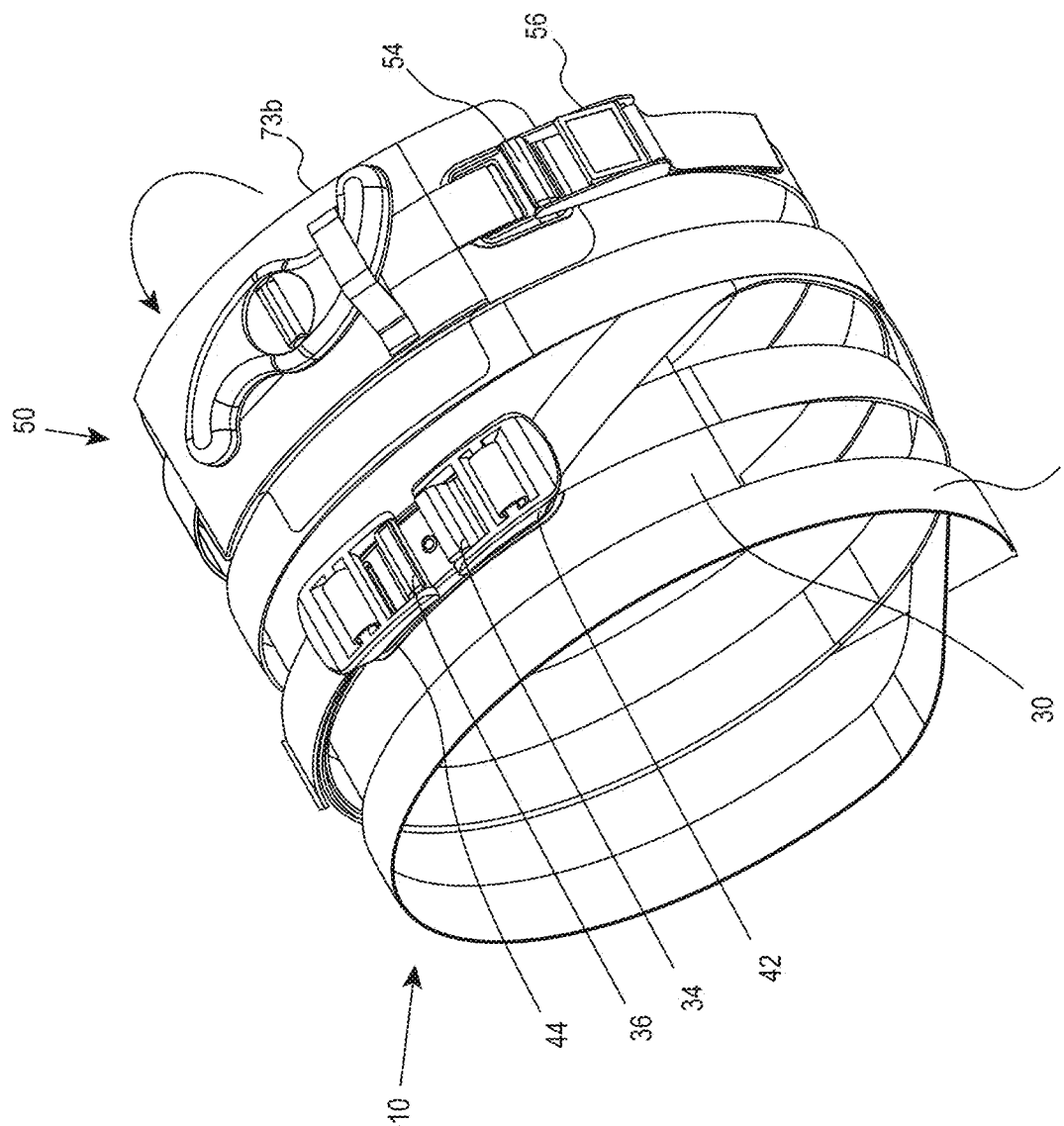
FIG. 1F is the first-aid device of FIG. 1D, with the hand omitted for illustration purposed.

The presently disclosed subject matter according to the different aspects detailed above is related to various devices for controlling blood flow of a bleeding (hemorrhagic) injury.

Attention is first directed to FIGS. 1A-1F and 2A-2D of the drawings illustrating an example of a first-aid device of the presently disclosed subject matter, generally designated 1.

The first-aid device 1 is configured to be used for controlling a bleeding injury 3 of a limb in the form of a hand 2 (shown in FIG. 1E) of a patient. The first-aid device 1 comprises an emergency bandage 10 and a tourniquet 50 attached to each other, and forming together the first-aid device 1.

As a result of the bleeding injury 3, the patient may lose a lot of blood which may cause to amputation of a limb or even death, based on the degree of the injury e.g., how fast the patient is losing blood, and the number of patients which require simultaneously treatment. At these situations, the use of the emergency bandage 10 and/or the tourniquet 50 is required for controlling the blood flow, and even stop it.

While the main purpose of the emergency bandage 10 is to staunch blood flow from the traumatic bleeding injury 3 by being directly applied over the bleeding injury 3 and applying direct pressure thereon, the main purpose of the tourniquet 50 is to completely or almost completely restrict the blood flow to the bleeding injury 3 by being disposed at a predetermined distance therefrom. Each of these two first-aid devices, i.e., the emergency bandage 10 and the tourniquet 50, is usually applied in accordance with different treatment protocols, in accordance with the severity levels of the injury, and differently from the presently disclosed subject matter, each of these devices is usually provided and used separately from each other.

The emergency bandage 10 is configured to be used for applying direct pressure on the bleeding injury 3, and absorbing blood therefrom, and the tourniquet 50 is configured to be used to control restrict blood flow from the bleeding injury 3 in case it has not responded adequately to the emergency bandage 10 or in situations of significant or even life threatening bleeding with the need for additional interventions.

The first-aid device 1 is a combination of the emergency bandage 10 and the tourniquet 50 integrally provided in one device side-by-side in proximity to each other. According to the particular example, the emergency bandage 10 and the tourniquet 50 are detachable from one another, for example, in order to replace a used emergency bandage 10 with a new one, or when there is a need to locate and mount the tourniquet 50 to the hand 2 at a distant location from the emergency bandage 10 due to various medical requirements. The first-aid device 1 of the presently disclosed subject matter provides various advantages over other known first-aid devices. For example, the first-aid device 1 can provide flexibility to be used for all the spectrum of severity levels of bleeding injuries, with the ability to switch from non severe levels to severe levels, and vice versa, in a gradual and controlled manner, without risking the patient, and in an efficient and a quick manner Due to the simplicity of its operation and the ability to switch between using the emergency bandage 10 and the tourniquet 50 in the above manner, the first-aid device 1 can be operated by a non-professional user, i.e., not a doctor or a paramedic.

Detailed explanations are now made with respect to the structure and the functionality of the emergency bandage 10. The emergency bandage 10 has a blood absorbing portion 20, which according to the present example is a hemostatic wound dressing configured for absorbing significant amounts (e.g., about 500 cc) of blood from the bleeding injury 3. The blood absorbing portion 20 has a first absorbing surface 24 configured for facing and contacting the bleeding injury 3, an opposite second absorbing surface 26, and a central point 22 (best seen in FIGS. 1B, 2A and 2B) that is disposed at the geometric center thereof, i.e., at the center of its width and length. The central point 22 is configured for being positioned over the center of the bleeding injury 3 in order to apply direct pressure thereon, as detailed below.

The emergency bandage 10 further comprises a cover layer 30 disposed over and connected to the second absorbing surface 26, and a bandage strap 40 connected to the cover layer 30. The cover layer 30 has a top surface 31a and a bottom surface 31b.

The bandage strap 40 is configured for securely mounting the blood absorbing portion 20 with its cover layer 30 to the hand 2 with the first absorbing surface 24 of the blood absorbing portion 20 being positioned over the bleeding injury 3.

The emergency bandage has a bandage longitudinal axis X1 extending through the central point 22, and the bandage strap 40 extends along the bandage longitudinal axis X1.

The bandage strap 40 further has a double port 32 including a first bandage locking port in the form of a first hook 34, a second bandage locking port in the form of a second hook 36, and a bridging member 35 interconnecting therebetween. The double port 32 is disposed on and connected to the top surface 31a of the cover layer 30, so that the first hook 34 and the second hook 36 are disposed along the bandage longitudinal axis X1. The first hook 34 and the second hook 36 have a similar structure and are facing away from each other.

The first hook 34 and the second hook 36 are disposed on opposite sides of the central point 22, with a secondary emergency bandage axis X3 that is perpendicular to the bandage longitudinal axis, extending therebetween.

The emergency bandage 10 also has a pressure application member 47 disposed between the second absorbing surface 26 and the bottom surface 31b, and above the central point 22. The pressure application member 47 is connected to bottom surface 31b by a screw 38 (shown in details in FIG. 2B). The screw 38 extends through the cover layer 30 and connects between the bridging member 35 of the double port 32 and the pressure application member 47.

The pressure application member 47 is configured for applying direct pressure onto the bleeding injury 3 upon securing the bandage strap 40 when securely mounting the blood absorbing portion 20 over the bleeding injury 3, thereby assisting in stopping the bleeding from the bleeding injury 3.

The position of the pressure application member 47 between the blood absorbing portion 20 and the cover layer 30, and for example, not above the top surface 31a of the cover layer 30, causes the pressure application member 47 to be very close to the bleeding injury 3, and thereby improving its functionality for applying the direct pressure on the injury and assisting in stopping the bleeding.

Figure 2A:
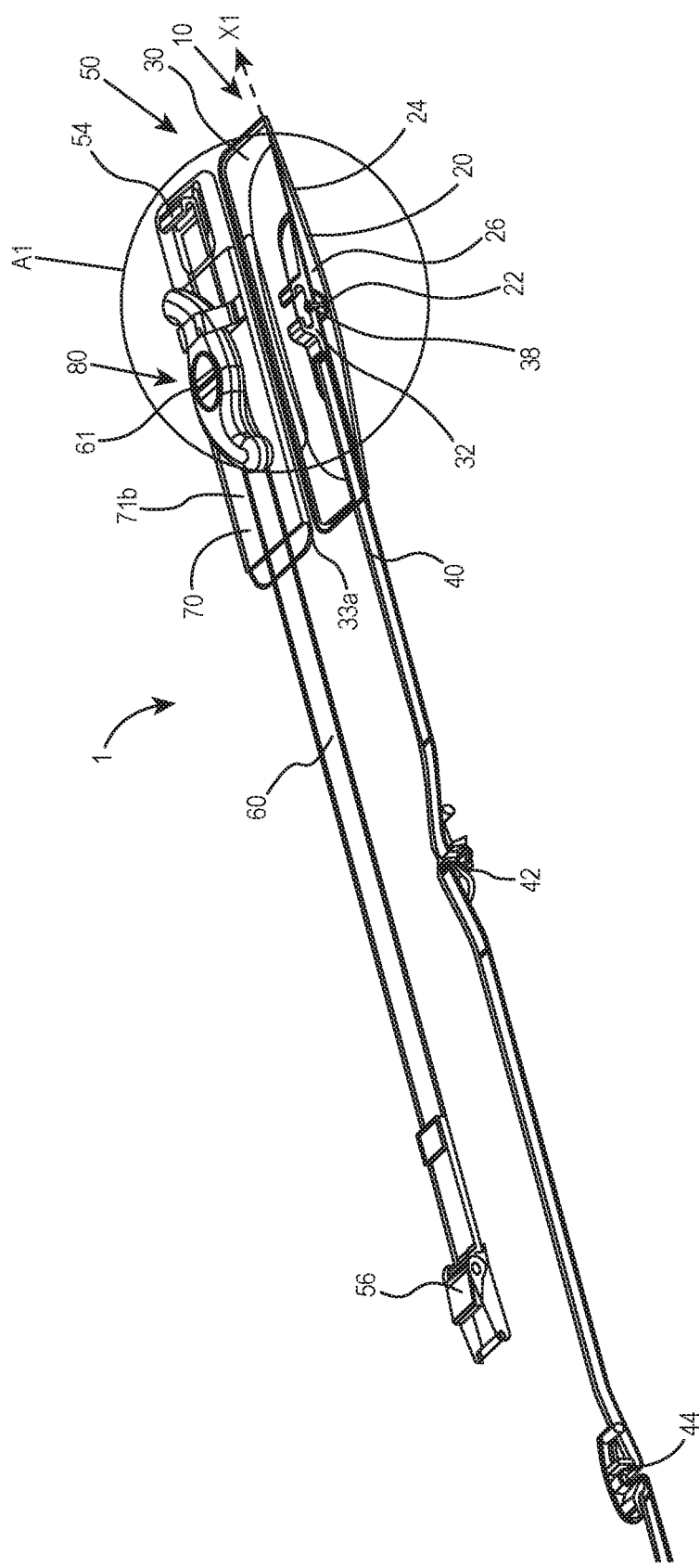
FIG. 2A is a cross-sectional view along line A-A in FIG. 1A.
Figure 2B:
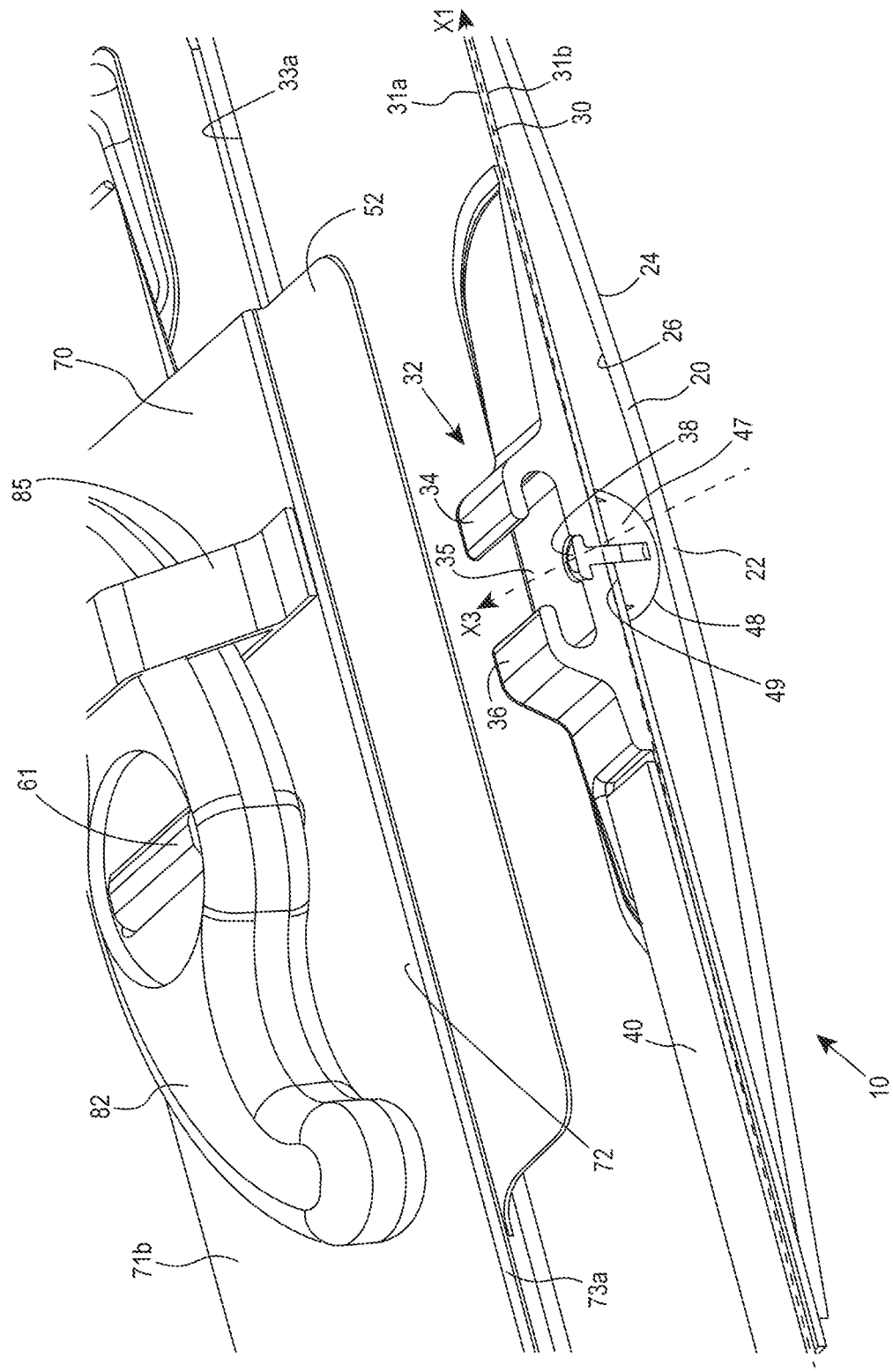
FIG. 2B is an enlarged view of section A1 of FIG. 2A.
Figure 2C:
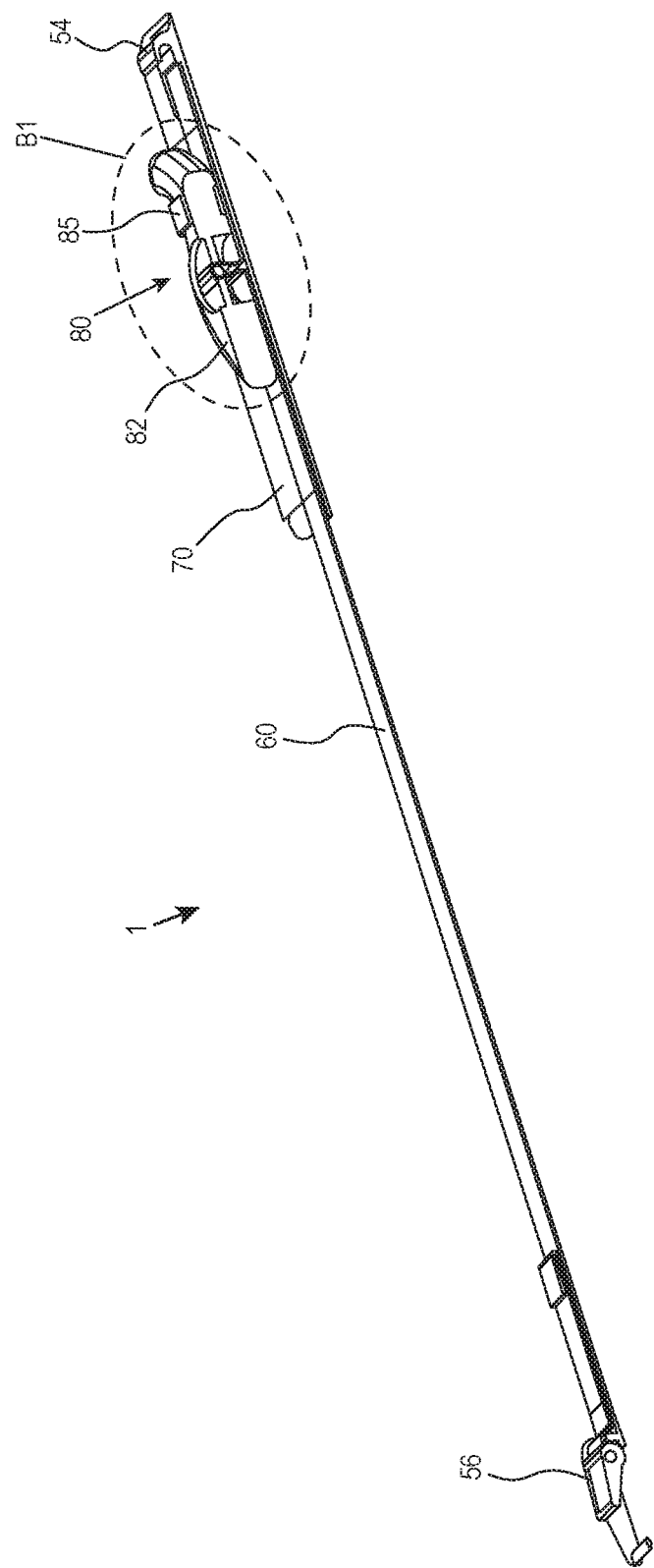
FIG. 2C is a cross-sectional view along line B-B in FIG. 1A.
Figure 2D:
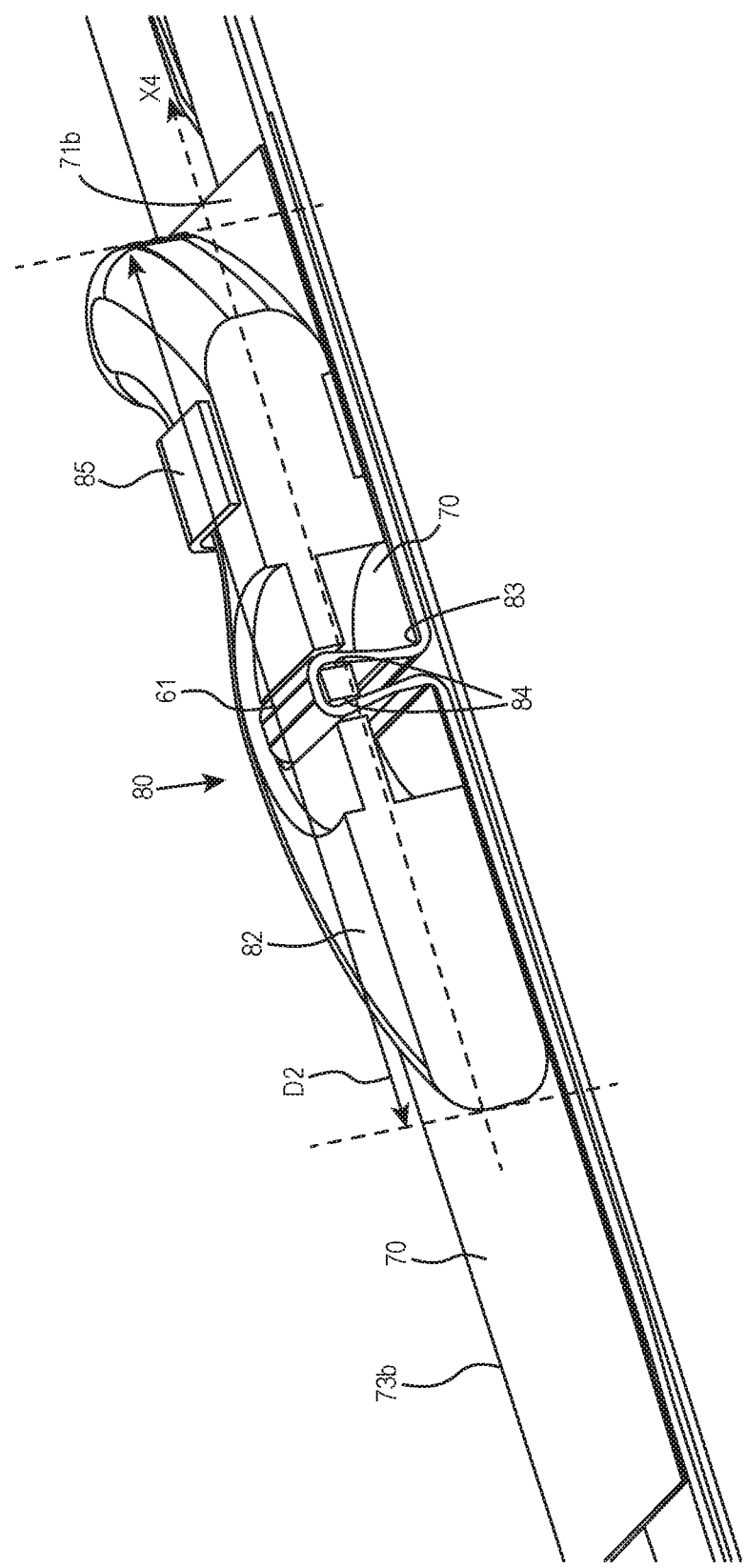
FIG. 2D is an enlarged view of section B1 of FIG. 2C.

As shown in FIG. 2B, the pressure application member 47 normally applies pressure on the second absorbing surface 26 and outwardly bends the blood absorbing portion 20. This structure can provide the operator with indication regarding the position of the pressure application member 47 and the central point 22 and assist him in correctly positioning the blood absorbing portion 20, and in particular, the pressure application member 47 directly above the bleeding injury 3.

The pressure application member 47 is made of a rigid material (e.g., plastic, metal, wood, etc.) and its rigidity is of course much higher than the rigidity of the blood absorbing portion 20. The double port 32 is made of a rigid material as well, configured for effectively transferring pressure generated by the tightened bandage strap 40 to the pressure application member 47.

The pressure application member 47 has a half spherical structure, with a round and smooth pressure surface 48 facing the second absorbing surface 26, and a flat back surface 49 juxtapose the bottom surface 31b. The shape of the pressure surface 48 is important in evenly applying the direct pressure on the bleeding injury 3 while not damaging the material of the blood absorbing portion 20.

The bandage strap 40 has a first bandage lockable element in the form of a first buckle 42 and a second bandage lockable element in the form of a second buckle 44 slidably mounted to the bandage strap 40 and spaced from each other along the length of the bandage strap 40, i.e., along the bandage longitudinal axis X1. The sliding of the first buckle 42 and the second buckle 44 allows fitting them to the perimeter of any particular limb. The first buckle 42 and the second buckle 44 are positioned in opposite orientation with respect to the bandage strap 40. This position can assist in correctly connecting first the first buckle 42 and the second buckle 44 to their respective first and second hooks, and using them in the correct order, as detailed below.

The bandage strap 40 is configured for securely mounting the blood absorbing portion to the hand 2 by a process comprising the following steps (detailed below with respect to FIG. 4A): in one step, after winding the bandage strap 40 around the hand 2, the first buckle 42 is attached to the first hook 34, and the bandage strap 40 is pulled, thereby applying to the blood absorbing portion 20, and respectively to the bleeding injury 3, a first bandage pressure; and in a further step, a free portion of the bandage strap including the second buckle 46 is used for winding around the hand 2 at an opposite direction, the second buckle 44 is attached to the second hook 36, and the bandage strap 40 is pulled again by this time in an opposite direction, thereby applying to the blood absorbing portion, and respectively to the bleeding injury 3, an additional bandage pressure. The result of this process is a total direct pressure of the first bandage pressure and the additional bandage pressure applied mainly by the pressure application member 47 on the bleeding injury 3.

The dual locking mechanism provided by the double port 32 and the first buckle 42 and the second buckle 44 provides a better control of the degree of direct pressure applied by the emergency bandage 10 to the bleeding injury 3. In other words, in order to apply one degree of direct bandage pressure, the first hook 34 and its respective first buckle 42 are used and if the bleeding doesn't stop, an additional degree of direct bandage pressure can be applied by using the second hook 36 and its respective second buckle 44.

The tourniquet 50 has a tourniquet longitudinal axis X2 and attached to the emergency bandage so that, in a plan view of the device (shown in FIGS. 1B and 1C), the tourniquet longitudinal axis X2 is spaced from the central point 22 of the emergency bandage 10 to a distance D1 required for limiting blood flow to the bleeding injury 3. Moreover, in a plan view of the first-aid device 1, the tourniquet longitudinal axis X2 is spaced from the entire blood absorbing portion 20.

The tourniquet 50 has a tourniquet strap 60 extending along the tourniquet longitudinal axis X2 and configured for securely mounting the tourniquet 50 to the hand 2.

The structure of the first-aid device 1 and, in particular, the distance D1 between the tourniquet 50 and the central point 22 of the emergency bandage 10 also allows correctly positioning the tourniquet 50 with respect to the bleeding injury 3, i.e., not too close and not too far therefrom, and at the part of the hand 2 that is positioned proximal to the heart, i.e., above the bleeding injury 3. In the case of severe bleeding and life-or-death emergencies, properly positioning the tourniquet 50 in an effective way is highly important to control the bleeding until an injured person receives proper medical attention. Thus, the first-aid device 1 can assist in this proper positioning.

According to different examples, the distance D1 can be at least 3 cm, and in the present example D1 is equal to about 4 cm, as required by common first-aid treatment protocols for tourniquet application. The tourniquet longitudinal axis X2 is parallel to the bandage longitudinal axis X1, and the distance therebetween is also D1.

Figure 3A:
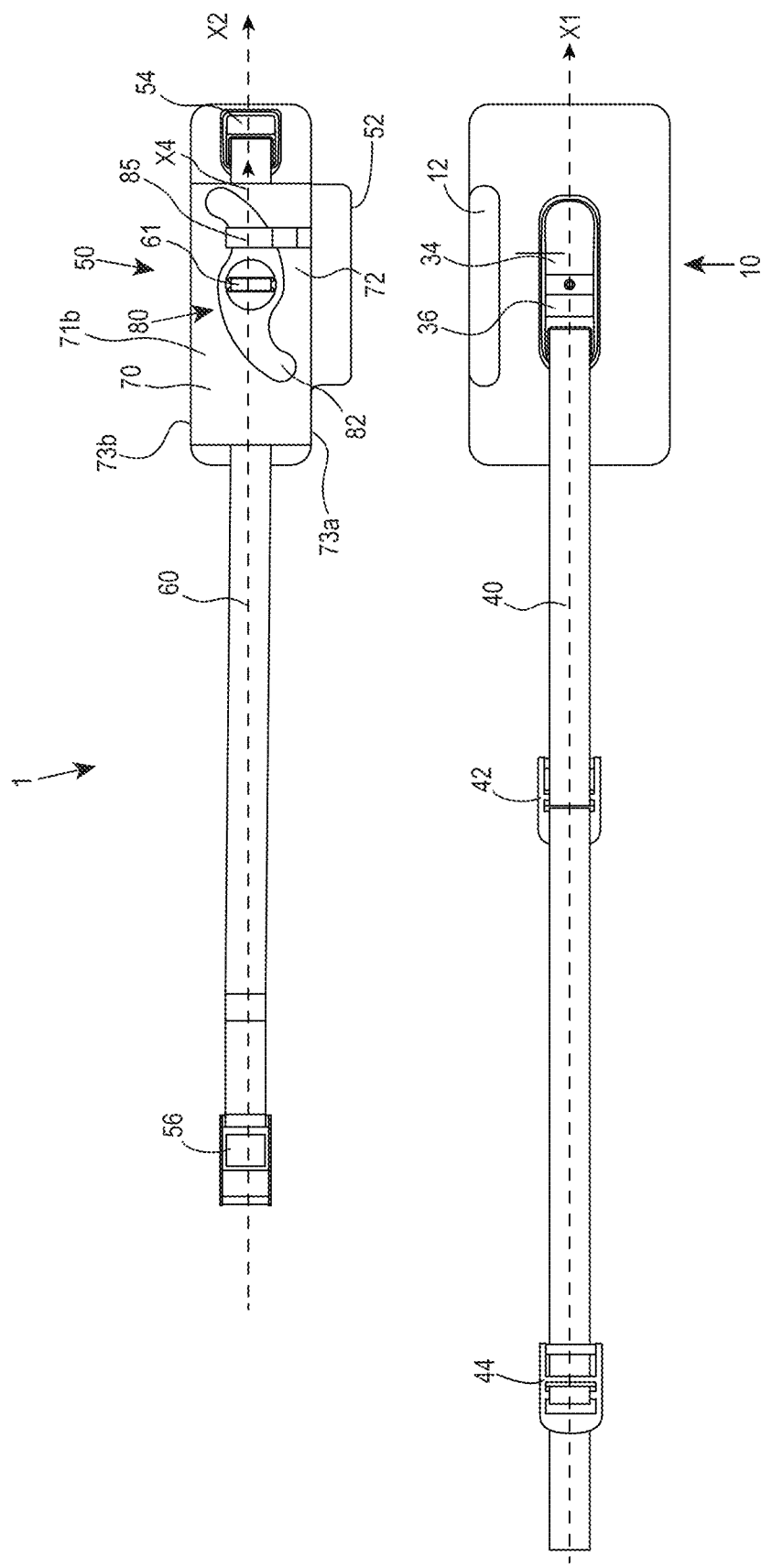
FIG. 3A is the first-aid device of FIG. 1C, in which the emergency bandage is detached from the tourniquet.
Figure 3B:
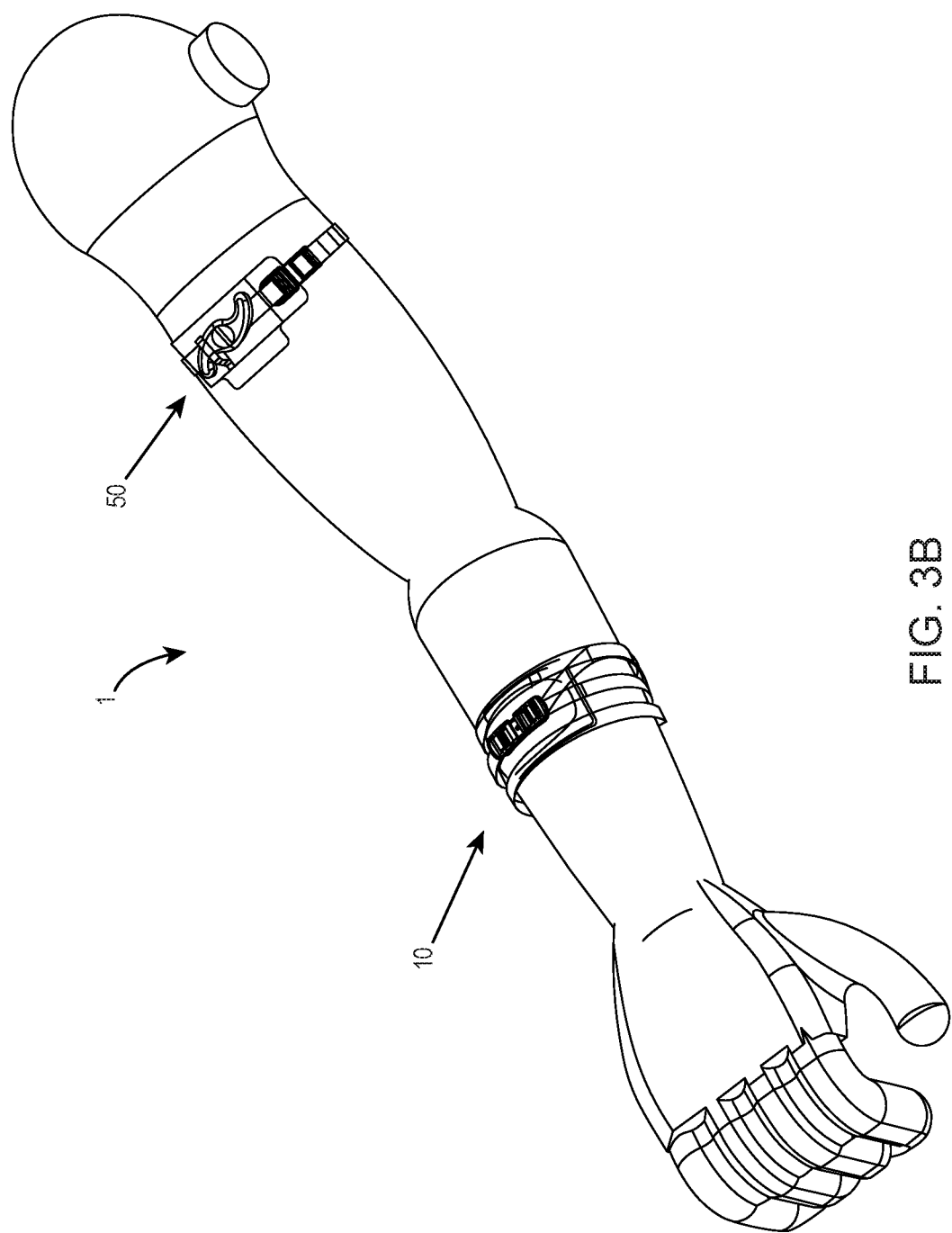
FIG. 3B is the first-aid device of FIG. 1D, in which the emergency bandage is detached from the tourniquet.

According to the particular example shown in the drawings, and in particular. In FIGS. 3A and 3B, the tourniquet 50 is detachable from the emergency bandage 10. The emergency bandage 10 comprises a bandage interconnecting member 12 and the tourniquet 50 comprises a tourniquet interconnecting member 52, both are hoop and loop fasteners providing the attachment and detachment between the emergency bandage 10 and the tourniquet 50. The bandage interconnecting member 12 is elongated so as to correspond in shape to the tourniquet interconnecting member 52.

According to another example, the tourniquet and emergency bandage can be attached to each other, so that they share a common housing, in the form of a sleeve, a cover layer, or any other flexible fabric.

The bandage interconnecting member 12 can further be configured for detachably attaching thereto an additional bandage interconnecting member of a second emergency bandage. Similarly, the tourniquet interconnecting member 52 can further be configured for detachably attaching thereto an additional tourniquet interconnecting member of a second tourniquet.

The cover layer 30 has two opposite side portions 33a and 33b extending along and two sides of the bandage longitudinal axis X1, so that the bandage interconnecting member being part of the side portion 33a. The bandage interconnecting member 12 is spaced from the bandage strap 40.

The tourniquet 50 has an elongated sleeve 70 extending along the tourniquet longitudinal axis X2, such that a portion of the tourniquet strap 60 passes therethrough. The sleeve 70 has a side portion 72 including the tourniquet interconnecting member 52 mounted thereto, so that in a plan view of the tourniquet 50, the tourniquet interconnecting member 52 is spaced from the tourniquet strap 60. The elongated sleeve 70 also has two opposite longitudinal boundaries 73a and 73b extending at two opposite sides of the tourniquet longitudinal axis X2 and generally parallel thereto. The tourniquet interconnecting member 52 includes a portion of the boundary 73a.

The sleeve 70 further has a sleeve first surface 71a configured for facing the hand 2 and an opposite sleeve second surface 71b comprising an access point 83 (shown in FIG. 2D) formed therein for allowing a strap portion 61 of the tourniquet strap 60 to extend therethrough.

The tourniquet 50 is further provided with a tourniquet locking port in the form of a tourniquet hook 54, and the tourniquet strap is provided with a tourniquet lockable element in the form of a spring loaded buckle 56 slidable along the tourniquet strap 60 and configured for attachment to the tourniquet hook 54. In order to securely mount the tourniquet strap 60 over the hand 2, the spring loaded buckle 56 has to be attached to the tourniquet hook 54, and a free end of the tourniquet strap 60 has to be pulled in order to apply to the hand 2 a first tourniquet pressure, and at least partially restrict blood flow to the bleeding injury 3.

The tourniquet 50 further has a lever-tightening mechanism 80 configured to be used following the application of the first tourniquet pressure, while the buckle 56 is attached to the tourniquet hook 54, for further tightening the tourniquet strap 60 and applying to the hand 2 an additional tourniquet pressure so as to fully restrict blood flow to the bleeding injury 3.

The lever-tightening mechanism 80 is configured with an elongated rotatable element 82 having two slits 84 through which the strap portion 61 that passes through the access point 83 is threaded so as to provide connection between the rotatable element 82 and the tourniquet strap 60.

The rotatable element 82 is rotatable together with the strap portion 61 between an initial state in which the rotatable element is disposed, in a plan view of the tourniquet, between the longitudinal boundaries 73a and 73b, and one or more pressure exerting state in which the strap portion 61 and proximal side portions of the tourniquet strap 60 are twisted so as to further tension the tourniquet strap 60 over the hand 2. The rotation of the rotatable element 82 from the initial state to the pressure exerting state is performed in a counterclockwise direction so as to further tighten the tourniquet strap 60 and apply to the hand 2 an additional tourniquet pressure so as to fully restrict blood flow to the bleeding injury 3. The total pressure exerted on the hand 2 is thus a sum of the first tourniquet pressure and the additional tourniquet pressure.

The above position of the rotatable element 82 at the initial state is advantageous over another position at which portions of the rotatable element extend beyond one or both of longitudinal boundaries, since it allows the tourniquet 50 to be more compact before usage of the rotatable element 82, without disturbing the proximal surrounding of the tourniquet 50. For example, when the emergency bandage 10 is attached to the tourniquet 50, the above position of the rotatable element 82 at the initial state, does not disturb in operating the emergency bandage 10.

The rotatable element 82 can have an elongated rotatable element longitudinal axis X4, so that at the initial state, the elongated rotatable element longitudinal axis X4 is substantially parallel to the tourniquet longitudinal axis X2.

The elongated rotatable element also has a length dimension D2 extending along said rotatable element longitudinal axis. The length dimension D2 is greater than a distance D3 between the longitudinal boundaries 73a and 73b.

The tourniquet 50 also has a flexible securing member 85 disposed over and connected to the sleeve 70 and configured for releasably locking the rotatable element 82 at one or more of the pressure exerting states, so that in a plan view of the tourniquet, the rotatable element 82 is disposed between the longitudinal boundaries of the sleeve 70.

The bandage strap 40 is more elastic than the tourniquet strap 60. The bandage strap 40 is made of a flexible material to prevent over-tightening thereof over the hand 2 thereby unintentionally restricting blood flow to the rest of the hand 2, and acting unintentionally as a tourniquet. The tourniquet strap 60, on the other hand, is made of a much rigid material, enabling it to be effectively tightened over the limb and quickly restricting flood flow to the bleeding injury 3, as required. Moreover, it should be emphasized that the lever-tightening mechanism 80 of the tourniquet can generate significantly much higher pressure, than any trial to do same with the emergency bandage.

As shown in FIG. 3B, the tourniquet 50 can be detached from the emergency bandage 10, so as to mount the tourniquet 50 a distance distant from the emergency bandage, due to different treatment protocols and respective conditions of the hand 2.

Reference is now made to FIGS. 4A to 4D in order to explain how the emergency bandage 10 and the tourniquet 50 can be used by the operator of the first-aid device 1 separately and/or in conjunction with each other.

Figure 4A:
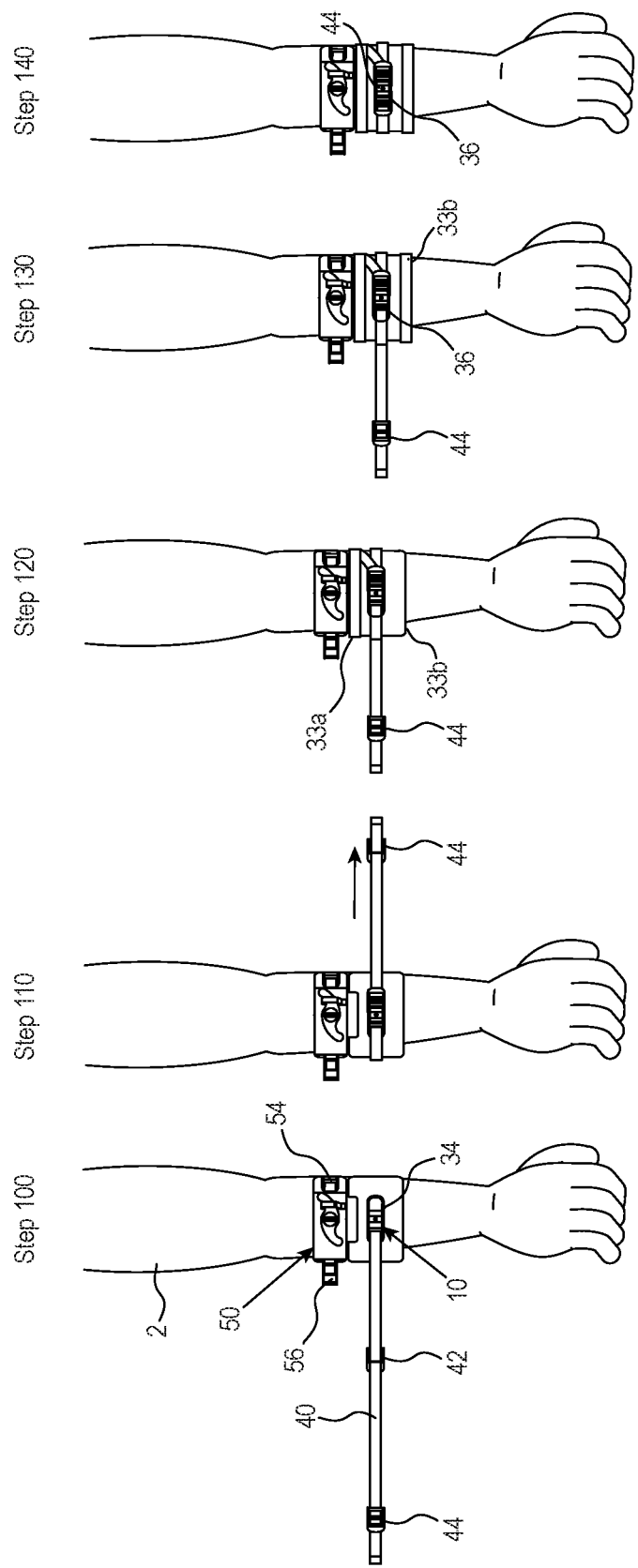
FIG. 4A is a plurality of drawings illustrating a step-by-step process of mounting the emergency bandage of FIG. 1A to the hand of the patient.

In particular, reference is now made to FIG. 4A, illustrating a step-by-step process of mounting the emergency bandage 10 to the hand 2.

As shown in step 100 of FIG. 4A, the emergency bandage 10 is placed above the bleeding injury 3 so that the central point 22 and the pressure application member 47 are positioned above a center of the bleeding injury 3. In step 110, half round of the bandage strap 40 is made with respect to the hand 2, and the first buckle 42 is attached to the first hook 34. Afterwards, a free end of the bandage strap 40 is pulled in order to apply to the blood absorbing portion 20, and respectively to the bleeding injury 3, a first bandage pressure. In step 120, a full round of the bandage strap 40 is made with respect to the hand 2, so that the a portion of the bandage strap 40 is wrapped in proximity to the side portion 33a. In step 130, an additional full round of the bandage strap 40 is made with respect to the hand 2, so that the other portion of the bandage strap 40 is wrapped in proximity to the side portion 33b. This position of the straps allows symmetrically enclosing the injury between the two portions of the straps, thereby efficiently treating the injury. In step 140, the second buckle 44 is attached to the second hook 36, and afterwards, a free end of the bandage strap 40 is pulled at an opposite direction in order to apply to the blood absorbing portion 20, and respectively to the bleeding injury 3, an additional bandage pressure. The result of this process is a total direct pressure of the first bandage pressure and the additional bandage pressure applied mainly by the pressure application member 47 on the bleeding injury 3, while the blood absorbing portion 20 absorbs blood from the bleeding injury 3. During the entire process of FIG. 4A, the tourniquet hook 54 is detached from the buckle 56, and the tourniquet 50 is thus inoperative.

Figure 4B:
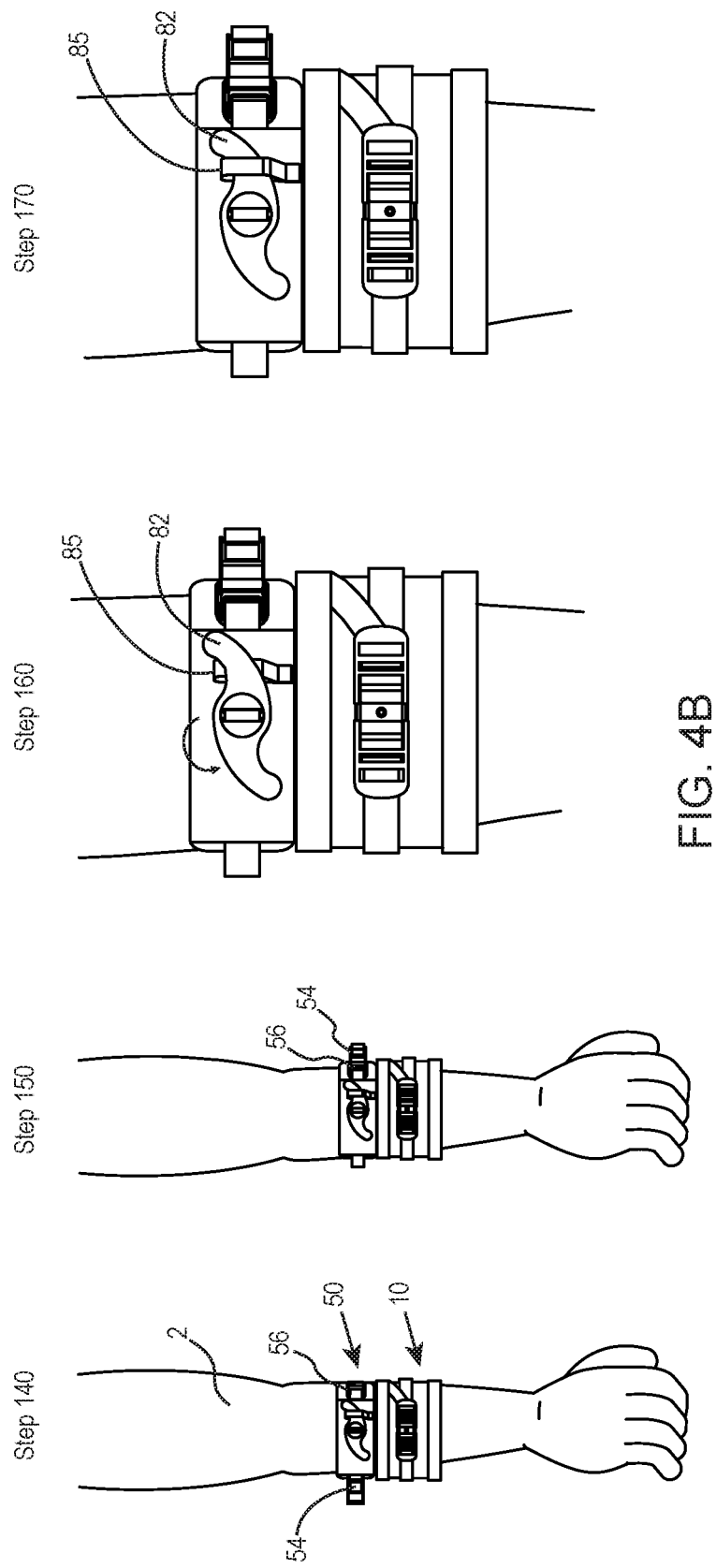
FIG. 4B is a plurality of drawings illustrating a step-by-step process of mounting the tourniquet of FIG. 1A to the hand of the patient for fully restricting blood flow, following the process of FIG. 4A.

If bleeding from the bleeding injury 3 does not stop following mounting of the emergency bandage 10 in the process of FIG. 4A, the tourniquet 50 should be applied in order to fully restrict blood flow to the bleeding injury 3, as detailed in a step-by-step process of FIG. 4B.

Reference is now made to FIG. 4B, illustrating a step-by-step process of mounting the tourniquet 50 to the hand 2 for fully restricting blood flow to the bleeding injury 3, following the process of FIG. 4A.

The process of FIG. 4B is applied when the bleeding from the bleeding injury does not stop, and application of the tourniquet 50 is required for completely restricting the blood flow to the bleeding injury 3.

In step 140 of FIG. 4B (and also of FIG. 4A), the emergency bandage 10 is mounted to the hand 2, and the tourniquet 50 is dismounted therefrom, while the tourniquet longitudinal axis X2 is spaced from the central point 22 of the emergency bandage 10 to the distance D1 required for limiting blood flow to the bleeding injury 3.

In step 150, the tourniquet strap 60 is securely mounted over the hand 2 by attaching the buckle 56 to the tourniquet hook 54, and pulling a free end of the tourniquet strap 60 in order to apply to the hand 2 a first tourniquet pressure, and at least partially restrict blood flow to the bleeding injury 3. If the bleeding still doesn't stop, a step 160 should be performed. In this position, the rotatable element 82 is at the initial state, in which the tourniquet strap 60 is not twisted.

In the step 160, the lever-tightening mechanism 80 is applied. For this, the rotatable element 82 is extracted from the securing member 85 to allow rotation of the rotatable element 82, and the rotatable element 82 is rotated a few times in a counterclockwise direction. This rotation causes the tourniquet strap 60 to apply additional tourniquet pressure to the hand 2, thereby fully restricting blood flow to the bleeding injury 3.

In step 170, when the rotation of the rotatable element 82 is stopped, the rotatable element 82 is at a pressure exerting state, and a respective part of the rotatable element 82 is introduced into the securing member 85, and thereby locked at this state.

Figure 4C:
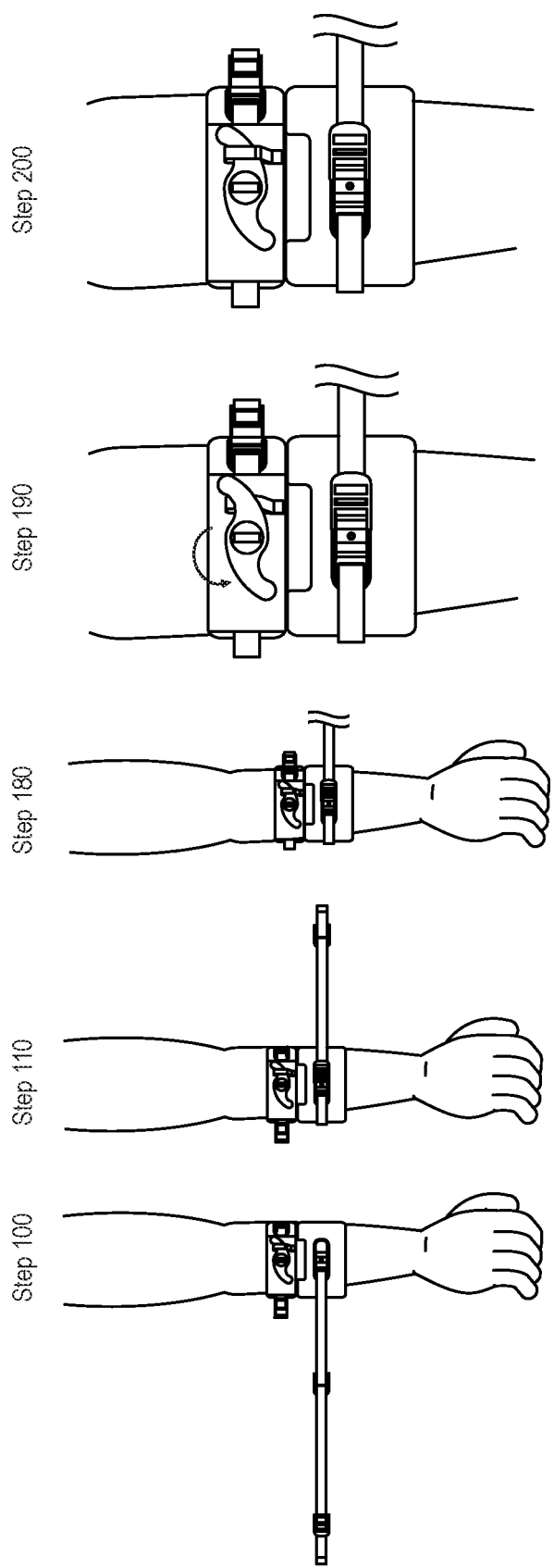
FIG. 4C is a plurality of drawings illustrating a step-by-step process of partially mounting the emergency bandage of FIG. 1A to the hand with a first bandage pressure applied thereon, and fully mounting the tourniquet of FIG. 1A.

Reference is now made to FIG. 4C, illustrating a step-by-step process of partially mounting the emergency bandage 10 to the hand 2 with a first bandage pressure applied thereon, and fully mounting the tourniquet 50. This process is used when the severity of the bleeding injury is very high, and it is decided by the operator from the beginning that full restriction of the blood flow by the tourniquet 50.

At the beginning of the process of FIG. 4C, the steps 100 and 110 of the process of FIG. 4A are applied in order to position the first-aid device 1 on the hand 2, and start absorbing blood from the bleeding injury until the tourniquet is fully mounted to the hand 2. However, instead of the steps 120, 130 and 140, the operated skip to steps for fully mounting the tourniquet 50 to the hand 2. In particular, the step 180 is similar to the step 150, the step 190 is similar to the step 160 and the step 200 is similar to the step 170. At the end of the process of FIG. 4C, the blood flow to the bleeding injury 3 is fully restricted, and the emergency bandage includes an absorbed flood. The process of FIG. 4C thus illustrates another advantage of the presently disclosed subject matter, according to which, although the tourniquet is mainly used, the emergency bandage is also used to assist is absorbing blood during the mounting of the tourniquet.

Figure 4D:
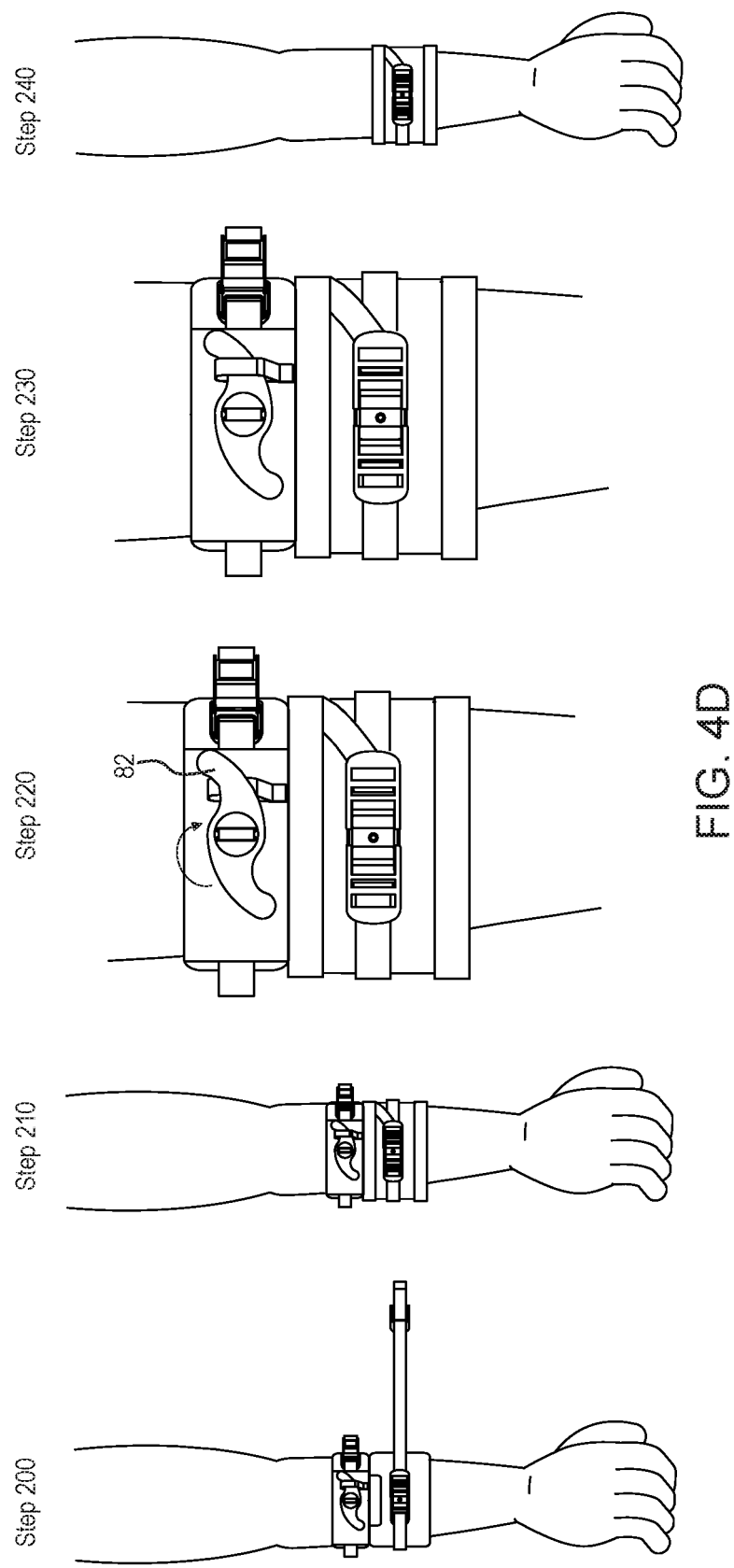
FIG. 4D is a plurality of drawings illustrating a step-by-step process of reducing the additional tourniquet pressure of FIG. 4B, while the emergency bandage being fully mounted to the hand with an additional bandage pressure applied thereon.

Reference is now made to FIG. 4D, illustrating a step-by-step process of reducing the additional tourniquet pressure of FIG. 4B, while the emergency bandage being fully mounted to the hand with an additional bandage pressure applied thereon. The process of FIG. 4D is usually performed by a professional operator (e.g., a doctor) at the hospital, in order to dismount the tourniquet 50 from the hand 2 in a controlled manner, however, by exploiting the emergency bandage as well.

Step 200 of FIG. 4D is similar to the step in FIG. 4C. At the position of step 200, the first bandage pressure is applied to the bleeding injury, as shown with respect to the step 110. However, in the step 200, the blood flow to the bleeding injury 3 is fully restricted by the tourniquet 50. At the next step 210, the bandage strap 40 is used so as to apply the additional bandage pressure. The use of the emergency bandage 10 in the step 210 is similar to the steps 120, 130 and 140 all together.

In the next step 220, the rotatable element 82 is extracted from the securing member 85, and rotated in a clockwise direction for half a round in order to slowly reduce the additional tourniquet pressure, and slowly allow blood flow therethrough.

Afterwards, the rotatable element 82 is locked again by the securing member 85, and the operator should wait a predetermined period of time. The steps 220 and 230 should be repeated by the operator in a controlled manner, until the tourniquet is fully dismounted and even detached from the emergency bandage as shown in step 240.

The invention claimed is:

1. An emergency bandage for controlling a bleeding injury, said emergency bandage comprising:
   a blood absorbing portion having a first absorbing surface configured for facing and absorbing blood from the injury and an opposite second absorbing surface;
   a cover layer disposed over the second absorbing surface;
   at least one bandage strap connected at least indirectly to the blood absorbing portion and configured for securely mounting the blood absorbing portion over the injury; and
   a pressure application member disposed at least partially between the first absorbing surface and the cover layer and configured for applying direct pressure onto the injury upon securing the bandage strap when mounting the blood absorbing portion over the injury;
   at least one bandage lockable element mounted to said bandage strap; and
   at least one bandage locking port disposed on the cover layer and configured for attachment to said at least one bandage lockable element, thereby securing the blood absorbing portion over the injury and applying a first direct pressure onto the injury; said at least one bandage locking port being connected directly to the pressure application member;
   wherein said at least one bandage lockable element is constituted by a first and a second bandage lockable elements mounted to and spaced from each other along the length of the bandage strap;
   wherein said at least one bandage locking port is constituted by two bandage locking ports disposed on the cover layer;
   wherein one of the two bandage locking ports is configured for attachment to the first bandage lockable element thereby securing the blood absorbing portion over the injury and applying said first direct pressure onto the injury, and the other one of the two bandage locking ports is configured for attachment to the second bandage lockable element thereby applying an additional direct pressure onto the injury.

2. The emergency bandage of claim 1, wherein said pressure application member is at least partially disposed between the second absorbing surface and a bottom surface of the cover layer.

3. The emergency bandage of claim 2, wherein the pressure application member protrudes from the bottom surface.

4. The emergency bandage of claim 1, wherein said blood absorbing portion has a central point such that said pressure application member is disposed at least partially above said central point.

5. The emergency bandage of claim 1, wherein said pressure application member normally applies pressure on the second absorbing surface and outwardly bends the blood absorbing portion.

6. The emergency bandage of claim 1, wherein said pressure application member has rigidity greater than a rigidity of the blood absorbing portion.

7. The emergency bandage of claim 6, wherein said pressure application member is made of a rigid material.

8. The emergency bandage of claim 1, wherein said pressure application member has a pressure surface configured for facing the second absorbing surface and said pressure surface is smooth.

9. The emergency bandage of claim 8, wherein said pressure application member has a back surface opposite to said pressure surface, and wherein said back surface is substantially flat and said pressure surface is spherical.

10. The emergency bandage of claim 1, wherein said pressure application member is fully disposed between the second absorbing surface and the cover layer.

11. The emergency bandage of claim 1, wherein said two bandage locking ports are connected directly to the pressure application member.

12. The emergency bandage of claim 11, wherein said two bandage locking ports are connected to each other by a bridging member constituting together a double port; and wherein said pressure application member is connected to said bridging member.

* * * * *